US012682531B2

(12) United States Patent
Huang et al.

(10) Patent No.: US 12,682,531 B2
(45) Date of Patent: Jul. 14, 2026

(54) AUDIO-DRIVEN FACIAL ANIMATION WITH ADAPTIVE SPEECH RATE

(71) Applicant: NVIDIA CORPORATION, Santa Clara, CA (US)

(72) Inventors: Zhengyu Huang, Shanghai (CN); Dmitry Korobchenko, London (GB); Junjie Lai, Beijing (CN); Tao Li, Beijing (CN); Yeongho Seol, Seoul (KR); Rui Zhang, Beijing (CN); Weihua Zhang, Beijing (CN); Yingying Zhong, Shanghai (CN)

(73) Assignee: NVIDIA CORPORATION, Santa Clara, CA (US)

( * ) Notice: Subject to any disclaimer, the term of this patent is extended or adjusted under 35 U.S.C. 154(b) by 391 days.

(21) Appl. No.: 18/363,455

(22) Filed: Aug. 1, 2023

(65) Prior Publication Data

US 2025/0029307 A1 Jan. 23, 2025

(30) Foreign Application Priority Data

Jul. 21, 2023 (CN) .......................... 202310904618.X

(51) Int. Cl.
| | |
|---|---|
| *G06T 13/20* | (2011.01) |
| *G06T 13/40* | (2011.01) |
| *G10L 15/02* | (2006.01) |
| *G10L 15/04* | (2013.01) |
| *G10L 15/16* | (2006.01) |

(52) U.S. Cl.
CPC ............ *G06T 13/40* (2013.01); *G06T 13/205* (2013.01); *G10L 15/02* (2013.01); *G10L 15/04* (2013.01); *G10L 15/16* (2013.01); *G10L 2015/025* (2013.01)

(58) Field of Classification Search
None
See application file for complete search history.

(56) References Cited

U.S. PATENT DOCUMENTS

| | | | | |
|---|---|---|---|---|
| 11,646,009 B1 * | 5/2023 | Chhetri | .................. | G10L 15/16 |
| | | | | 704/232 |
| 2007/0192910 A1 * | 8/2007 | Vu | ......................... | H04N 7/142 |
| | | | | 901/1 |
| 2021/0233299 A1 * | 7/2021 | Zhou | ..................... | G06T 13/205 |

OTHER PUBLICATIONS

Hu, Chenxu; Neural Dubber: Dubbing for Videos According to Scripts; Oct. 2021; 35th Conference on Neural Information Processing Systems; p. 1-10; https://proceedings.neurips.cc/paper_files/paper/2021/file/8a9c8ac001d3ef9e4ce39b1177295e03-Paper.pdf (Year: 2021).*

(Continued)

*Primary Examiner* — Joni Hsu
(74) *Attorney, Agent, or Firm* — Squire Patton Boggs LLP; Sarah Mirza

(57) ABSTRACT

In various examples, a technique for audio-driven facial animation with adaptive speech includes determining that a rate of speech associated with an audio segment exceeds a threshold. The technique also includes based at least on the rate of speech exceeding the threshold, upsampling a first set of features associated with the audio segment into a second set of features that is different in size than the first set of features. The technique further includes generating, using one or more machine learning models and based at least on at least a subset of the second set of features, a facial animation output corresponding to the audio segment.

20 Claims, 15 Drawing Sheets

(56) References Cited

OTHER PUBLICATIONS

Huang, X.; Fine-grained talking face generation with video rein-terpretation; Sep. 2020; The Visual Computer, vol. 37, p. 95-105; https://doi.org/10.1007/s00371-020-01982-7 (Year: 2020).*

Montesinos, Juan; A cappella: Audio-visual Singing Voice Separa-tion (Supplementary Material); Apr. 2021; The 32nd British Machine Vision Conference; p. 1-4; https://raw.githubusercontent.com/IPCV/Acappella/master/supplementary_material.pdf (Year: 2021).*

Karras et al., "Audio-Driven Facial Animation by Joint End-to-End Learning of Pose and Emotion", ACM Transactions on Graphics, vol. 36, No. 4, Article 94, Jul. 2017, 12 pages. https://users.aalto.fi/~laines9/publications/karras2017siggraph_paper.pdf.

Fan et al., "FaceFormer: Speech-Driven 3D Facial Animation with Transformers", arXiv:2112.05329v4 [cs.CV], Mar. 17, 2022, 13 pages. https://arxiv.org/pdf/2112.05329.pdf.

Cudeiro et al., "Capture, Learning, and Synthesis of 3D Speaking Styles", Max Planck Institute for Intelligent Systems, Tubingen, Germany, arXiv:1905.03079v1 [cs.CV] May 8, 2019, 11 pages. https://ps.is.mpg.de/uploads_file/attachment/attachment/510/paper_final.pdf.

Richard et al., "MeshTalk: 3D Face Animation from Speech"using Cross-Modality Disentanglement, arXiv:2104.08223v2 [cs.CV] May 20, 2022, 10 pages. https://arxiv.org/pdf/2104.08223.pdf.

* cited by examiner

300

Audio Input
302

Feature Matrix
304

$$\begin{bmatrix} E[X_1X_1] & E[X_1X_2] & ... & E[X_1X_n] \\ E[X_2X_1] & E[X_2X_2] & ... & E[X_2X_n] \\ E[X_3X_1] & E[X_3X_2] & ... & E[X_3X_n] \\ ... & ... & ... & ... \\ E[X_nX_1] & E[X_nX_2] & ... & E[X_nX_n] \end{bmatrix}$$

Neutral          [1, 0, 0, 0]

Joy              [0, 1, 0, 0]          Emotion Vector
                                        310
Anger        [0, 0, 1, 0]

Sad              [0, 0, 0, 1]

Emotional State    [0, 0.65, 0, 0.35]    Blended Vector
                                          320

600

DATA CENTER
800

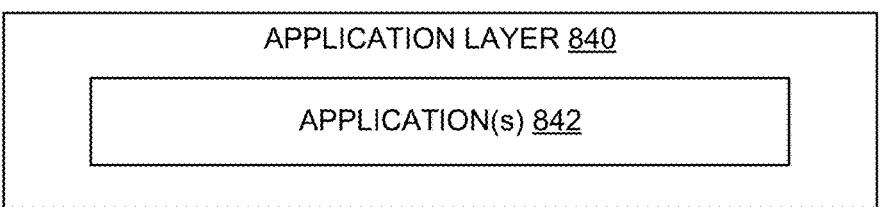

APPLICATION LAYER <u>840</u>

APPLICATION(s) <u>842</u>

SOFTWARE LAYER <u>830</u>

SOFTWARE <u>832</u>

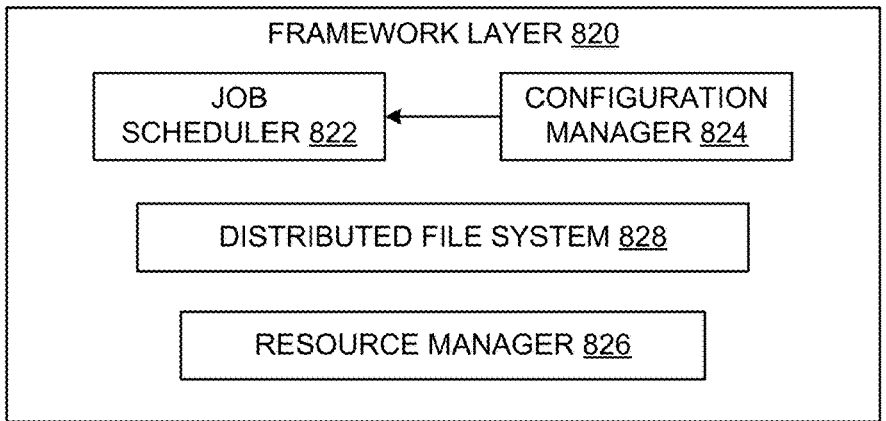

FRAMEWORK LAYER <u>820</u>

JOB SCHEDULER <u>822</u>

CONFIGURATION MANAGER <u>824</u>

DISTRIBUTED FILE SYSTEM <u>828</u>

RESOURCE MANAGER <u>826</u>

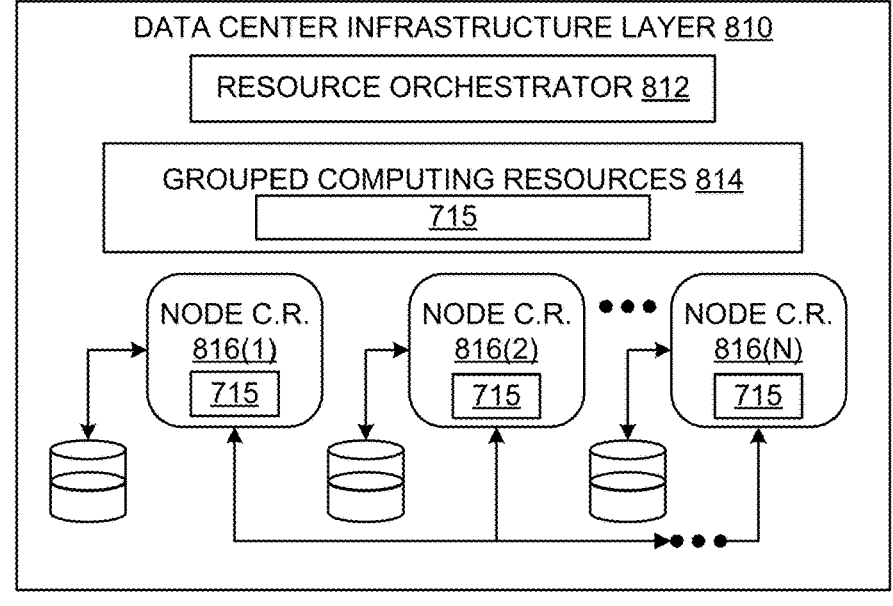

DATA CENTER INFRASTRUCTURE LAYER <u>810</u>

RESOURCE ORCHESTRATOR <u>812</u>

GROUPED COMPUTING RESOURCES <u>814</u>

<u>715</u>

NODE C.R. <u>816(1)</u>

<u>715</u>

NODE C.R. <u>816(2)</u>

<u>715</u>

• • •

NODE C.R. <u>816(N)</u>

AUDIO-DRIVEN FACIAL ANIMATION WITH ADAPTIVE SPEECH RATE

CROSS-REFERENCE TO RELATED APPLICATIONS

This application claims priority to Chinese Patent Application No. 202310904618.X, filed on Jul. 21, 2023, which is hereby incorporated by reference in its entirety.

BACKGROUND

Audio-driven facial animation refers to the use of audio data to drive the generation of an animated character speaking and/or making facial expressions that are synchronized with the audio data. Audio-driven facial animation can thus be used to create realistic, expressive, and engaging characters that appear in games, films, digital avatar systems, real-time digital assistants, in-vehicle assistants, and/or other environments.

Audio-driven facial animation is commonly performed by analyzing the audio data to extract phonetic information and subsequently matching the phonetic information to corresponding facial movements and/or expressions. Traditionally, this process is performed manually by an animator with domain expertise via a time-consuming and resource-intensive process. For example, the animator may initially identify different points in time at which various phonetic sounds appear in an audio track. Next, the animator may generate a facial animation that is synchronized with the audio track by manually setting and/or adjusting weights and/or parameters that model facial expressions and/or movements corresponding to the phonetic sounds at these points in time. Because a given audio track can include a large number of phonetic sounds and multiple weights and/or parameters have to be set and/or adjusted for each of the sounds, hours of manual work by the animator may be required to produce seconds of animation results.

More recently, machine learning techniques have been employed to automate the process of animating characters based on input audio data. However, these approaches can result in animations that lack sufficient realism and/or expressiveness. For example, a neural network may be trained to animate only the mouth region of a face to match speech represented by corresponding audio data. Because other portions of the face remain largely static within the animation, the animation may appear wooden, unemotional, or unconvincing to human viewers.

While more sophisticated deep learning models are capable of generating audio-driven facial animations that animate entire faces and incorporate emotions and expressions of the corresponding characters, these deep learning models are generally unable to adapt to variations in speech rate in the input audio. For example, a deep learning model may output motion or geometric deformation information for different regions (e.g., head, skin, eyes, tongue, etc.) of a face, given input that includes an audio segment with which the motion or geometric deformation information is to be synchronized, one or more emotions to be exhibited during the audio segment, and/or other parameters that affect the resulting facial animation. When the audio segment includes a "normal" speech rate (e.g., up to a certain number of phonemes/time period), the deep learning model may be capable of generating a realistic and expressive facial animation that matches the segment of audio. However, when the audio segment includes a "fast" speech rate (e.g., more than a certain number of phonemes), the deep learning model may fail to generate the correct shapes for the phonemes found in the segment of audio. Instead, the deep learning model may generate an overly "smooth" animation and/or a facial shape that is in between two or more facial shapes for two or more phonemes.

As such, a need exists for more effective techniques for improving audio-driven facial animation in the presence of variable speech rates.

VBCCSUMMARY

Embodiments of the present disclosure relate to audio-driven facial animation with adaptive speech rate. The techniques described herein include determining that a rate of speech associated with an audio segment exceeds a threshold. The techniques also include based at least on the rate of speech exceeding the threshold, upsampling a first set of features associated with the audio segment into a second set of features that is different in size than the first set of features. The technique further includes generating, using one or more machine learning models and based at least on at least a subset of the second set of features, a facial animation output corresponding to the audio segment.

One technical advantage of the disclosed techniques relative to prior approaches is the ability to adapt audio-driven facial animation techniques to audio with varying speech rates. Accordingly, the disclosed techniques can be used to improve the accuracy, realism, and/or expressiveness of the facial animations when compared with conventional audio-driven facial animation approaches that do not account for varying speech rates in input audio. Another advantage of the disclosed techniques is that the improvement in animation quality for fast speech rates can be achieved without requiring machine learning models involved in the audio-driven facial animation to be trained using audio data that includes varying speech rates. Consequently, the disclosed techniques avoid additional overhead and resource consumption associated with collecting additional training data for the machine learning models and training the machine learning models using the additional training data.

BRIEF DESCRIPTION OF THE DRAWINGS

The present systems and methods for audio-driven facial animation with adaptive speech rate are described in detail below with reference to the attached drawing figures, wherein:

FIG. 8 illustrates an example data center system, according to various embodiments;

DETAILED DESCRIPTION

Figure 1:
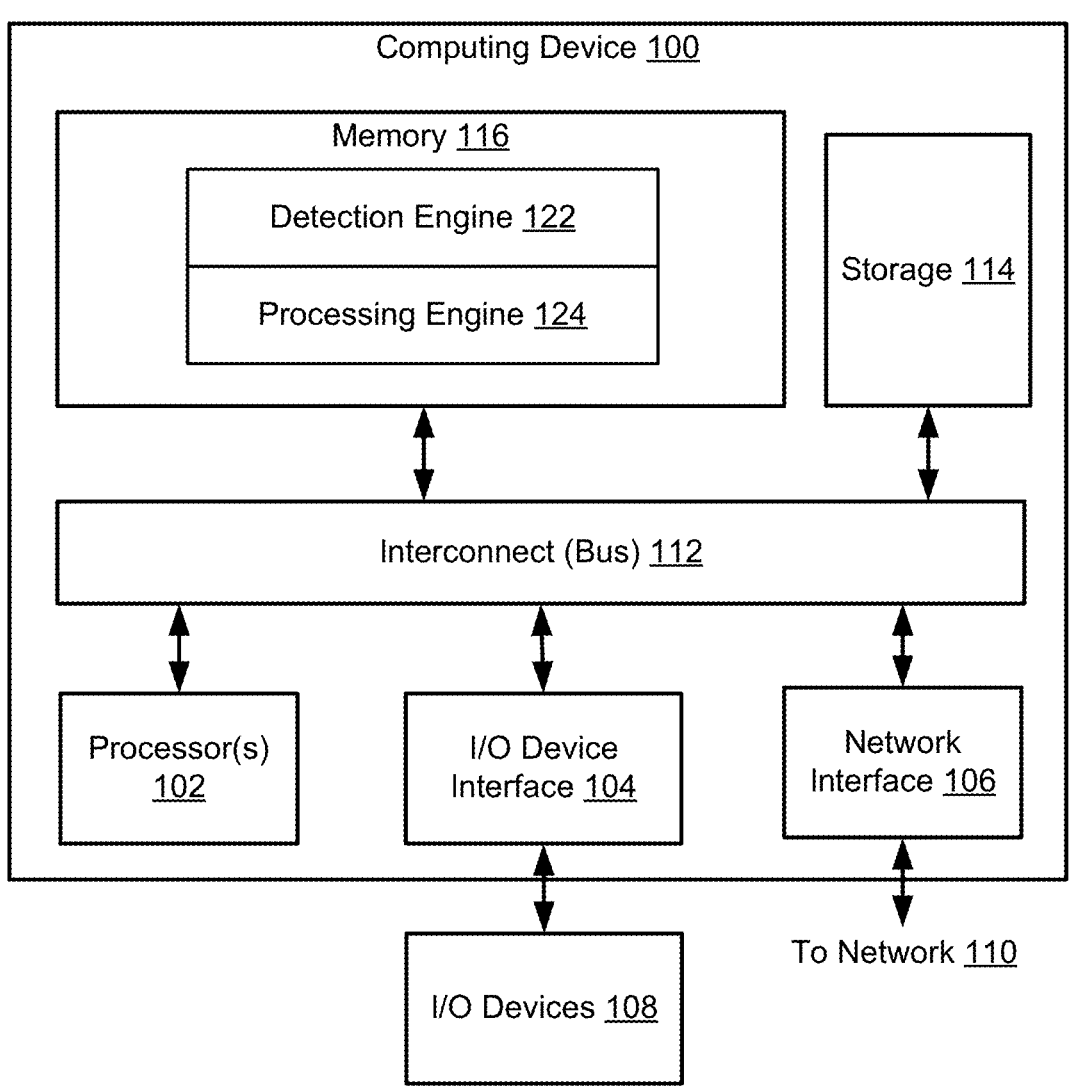
FIG. 1 illustrates a computing device configured to implement one or more aspects of various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implementing one or more large language models (LLMs), systems implemented at least partially in a data center, systems for performing conversational AI operations, systems for performing light transport simulation, systems for performing collaborative content creation for 3D assets, systems implemented at least partially using cloud computing resources, and/or other types of systems.

As discussed herein, traditional techniques for performing audio-driven facial animation involve manually setting and/or adjusting weights and/or parameters that represent facial expressions and/or movements for phonetic sounds at various points in time at which various phonetic sounds appear in an audio track, which is time-consuming, resource-intensive, and difficult to scale. While machine learning techniques have been developed to automatically animate characters based on input audio data and/or to depict emotions and expressions of the corresponding characters, these machine learning techniques are unable to adapt to variations in speech rate within the input audio.

To improve the generation of facial animations in the presence of varying speech rates in the corresponding input audio tracks, the disclosed techniques determine whether the speech rate within a given audio segment exceeds one or more thresholds. For example, a neural network and/or another type of audio-processing component may be used to detect a number of phonemes, a number of transitions between phonemes, and/or another measure of the speech rate within a 0.5-second audio segment. The audio-processing component may also, or instead, compute the speech rate as an exponential moving average and/or another aggregation of individual measures of speech rates across multiple audio segments that fall within a given window of time. The speech rate may be compared with one or more thresholds representing various speech rates that are higher than a normal speech rate. If the detected speech rate meets or exceeds a given threshold, the detected speech rate may be determined to be at or above the high speech rate represented by the threshold. If the detected speech rate falls below all thresholds, the detected speech rate may be determined to correspond to a normal speech rate. A normal speech rate may be an empirically determined range of speech rates, such as a range of number of phonemes/time unit. Although primarily described with respect to speech rates that exceed a threshold, similar processes may be performed for speech rates that are below one or more thresholds—e.g., speech rates that are less than normal or expected speech rates.

When the speech rate associated with an audio segment is determined to exceed a given threshold, audio features that are extracted from the audio segment are upsampled, and some or all of the upsampled audio features are provided as input into one or more machine learning models that are used to perform facial animation for the audio segment. For example, an encoder and/or another type of neural network may be used to convert the audio segment into a list of, without limitation, 25 audio features. Within the list, the features may be ordered by time and represent contiguous subsets of the audio segment. When the speech rate of the audio segment exceeds a threshold representing a high speech rate, bilinear upsampling of the audio features may be performed to increase the number of audio features by a corresponding factor. A subset of the upsampled audio features may be selected and inputted into one or more neural networks. The neural network(s) may then convert the inputted subset of upsampled audio features into vertex locations, geometric deformations, and/or other representations of a facial shape or expression that matches the audio segment.

One technical advantage of the disclosed techniques relative to prior approaches is the ability to adapt audio-driven facial animation techniques to audio with varying speech rates. Accordingly, the disclosed techniques can be used to improve the accuracy, realism, and/or expressiveness of the facial animations when compared with conventional audio-driven facial animation approaches that do not account for varying speech rates in input audio. Another advantage of the disclosed techniques is that the improvement in anima-5 tion quality for fast speech rates can be achieved without requiring machine learning models involved in the audio-driven facial animation to be trained using audio data that includes varying speech rates. Consequently, the disclosed techniques avoid additional overhead and resource consumption associated with collecting additional training data for the machine learning models and training the machine learning models using the additional training data.

FIG. 1 illustrates a computing device 100 configured to implement one or more aspects of various embodiments. In at least one embodiment, computing device 100 includes a desktop computer, a laptop computer, a smart phone, a personal digital assistant (PDA), a tablet computer, a server, one or more virtual machines, an embedded system, a system on a chip, a computing system of an autonomous, semi-autonomous, or a non-autonomous machine, a talking kiosk, a smart display, and/or any other type of computing device configured to receive input, process data, and option-ally display images, and is suitable for practicing one or more embodiments. Computing device 100 is configured to run a detection engine 122 and a processing engine 124 that may reside in a memory 116. It is noted that the computing device described herein is illustrative and that any other technically feasible configurations fall within the scope of the present disclosure. For example, multiple instances of detection engine 122 and/or processing engine 124 may execute on a set of nodes in a distributed and/or cloud computing system to implement the functionality of com-puting device 100. Alternatively or additionally, computing device 100 may be implemented in a similar manner to the devices and/or systems described at least with respect to FIGS. 6-14.

In at least one embodiment, computing device 100 includes, without limitation, an interconnect (bus) 112 that connects one or more processors 102, an input/output (I/O) device interface 104 coupled to one or more input/output (I/O) devices 108, memory 116, a storage 114, and/or a network interface 106. Processor(s) 102 may include any suitable processor implemented as a central processing unit (CPU), a graphics processing unit (GPU), an application-specific integrated circuit (ASIC), a field programmable gate array (FPGA), an artificial intelligence (AI) accelerator, a deep learning accelerator (DLA), a parallel processing unit (PPU), a data processing unit (DPU), a vector or vision processing unit (VPU), a programmable vision accelerator (PVA) (which may include one or more VPUs and/or direct memory access (DMA) systems), any other type of process-ing unit, or a combination of different processing units, such as a CPU(s) configured to operate in conjunction with a GPU(s). In general, processor(s) 102 may include any technically feasible hardware unit capable of processing data and/or executing software applications. Further, in the con-text of this disclosure, the computing elements shown in computing device 100 may correspond to a physical com-puting system (e.g., a system in a data center or a machine) and/or may correspond to a virtual computing instance executing within a computing cloud.

In at least one embodiment, I/O devices 108 include devices capable of receiving input, such as a keyboard, a mouse, a touchpad, a VR/MR/AR headset, a gesture recognition system, a steering wheel, mechanical, digital, or touch sensitive buttons or input components, and/or a microphone, as well as devices capable of providing output, such as a display device, haptic device, and/or speaker. Additionally, I/O devices 108 may include devices capable of both receiv-ing input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

In at least one embodiment, network 110 is any techni-cally feasible type of communications network that allows data to be exchanged between computing device 100 and internal, local, remote, or external entities or devices, such as a web server or another networked computing device. For example, network 110 may include a wide area network (WAN), a local area network (LAN), a wireless (e.g., WiFi) network, and/or the Internet, among others.

In at least one embodiment, storage 114 includes non-volatile storage for applications and data, and may include fixed or removable disk drives, flash memory devices, and CD-ROM, DVD-ROM, Blu-Ray, HD-DVD, or other mag-netic, optical, or solid-state storage devices. Detection engine 122 and/or processing engine 124 may be stored in storage 114 and loaded into memory 116 when executed.

In one embodiment, memory 116 includes a random-access memory (RAM) module, a flash memory unit, and/or any other type of memory unit or combination thereof. Processor(s) 102, I/O device interface 104, and network interface 106 may be configured to read data from and write data to memory 116. Memory 116 may include various software programs or more generally software code that can be executed by processor(s) 102 and application data asso-ciated with said software programs, including detection engine 122 and/or processing engine 124.

Detection engine 122 and processing engine 124 include functionality to analyze audio input that is used to drive the generation of an animated character speaking and/or making facial expressions that are synchronized with the audio data. More specifically, detection engine 122 and processing engine 124 are configured to adapt machine learning models for performing audio-driven facial animation to higher-than-normal speech rates. As described in further detail herein, detection engine 122 and processing engine 124 include functionality to detect the higher-than-normal speech rates in the audio input and upsample features generated from the audio input before the features are inputted into the machine learning models, thereby improving the accuracy, realism, and/or expressiveness of the audio-driven facial animations without requiring the machine learning models to be trained using audio data that includes varying speech rates.

Figure 2:
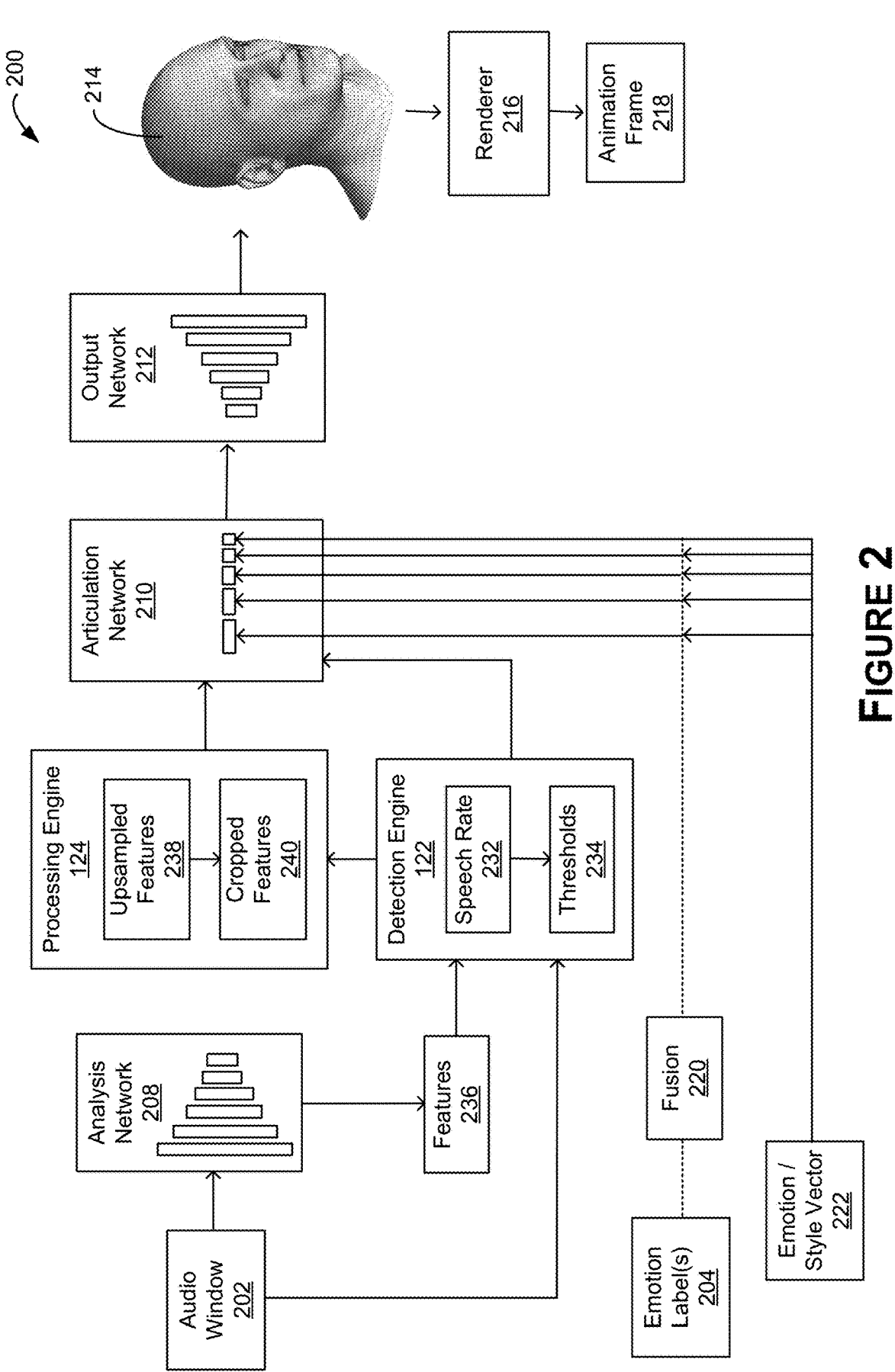
FIG. 2 illustrates a system for performing audio-driven facial animation that includes the detection engine and processing engine of FIG. 1, according to various embodiments.

FIG. 2 illustrates a system 200 for performing audio-driven facial animation that includes detection engine 122 and processing engine 124 of FIG. 1, according to various embodiments. As mentioned herein, detection engine 122 and processing engine 124 operate to detect higher-than-normal speech rates in audio input and upsample features generated from the audio input to improve the performance of machine learning models that use the audio input and/or features to perform audio-driven facial animation. As shown in FIG. 2, a segment of audio data-such as audio frames or a segment of audio within a current audio window 202—may be provided as input to an analysis network 208. Analysis network 208 analyzes the inputted audio data and converts the inputted audio data into a set of features 236.

For example, analysis network 208 may include a shared audio decoder and encoder for encoding audio features 236 in the form of an audio feature vector with a length of 25, which can be provided as input to an articulation network 210. Within the audio feature vector, features 236 may be temporally ordered, so that features 236 that appear in earlier positions within the audio feature vector represent earlier time periods within audio window 202 and features 236 that appear in later portions within the audio feature vector represent later time periods within audio window 202.

An emotion label 204 (or vector) and a style vector 222 can also be provided as input into articulation network 210. In some embodiments, only a single vector may be provided as input that includes both style and/or emotion data, as may be fused together using a fusion component 220 or process. Emotion vector 204 may include data for one or more emotions that apply to speech being used for training, such as an emotion that the voice actor was instructed to use when uttering the speech that was captured in the audio data. In some instances, this may include data for a single emotion label, such as "anger," or may include data for multiple emotions, such as "anger" and "sadness," as well as potentially relative weightings of those two emotions. These labels and/or weightings may have been provided to the voice actor initially, may have been determined after the speech was uttered, and/or may involve updated labels after hearing the speech that was uttered for an audio capture for a specific emotion, among other such options.

In at least one embodiment, style vector 222 may also be provided as input to articulation network 210 during training (and similarly in deployment and/or inference). Style vector 222 can include data relating to any aspect of the animation or facial component motion that modifies how one or more points for one or more facial components should move for a given emotion or emotion vector. This may include impacting motion of specific facial components, or providing a style of overall animation to be used, such as "intense" or "professional." Style vector 222 may also be viewed as a finer-grained control over emotion, where an emotion vector provides the label(s) of the emotion(s) to use, and the style provides finer control over how the emotion(s) is expressed through the animation. Other approaches to determining style data can be used as well. In different implementations, a single set of emotion and style vectors may be provided for a given audio clip, a set of vectors can be provided for each frame of animation to be generated, or a set of vectors can be provided for specific points or frames of animation (e.g., emotional keyframes) where at least one emotion or style value or setting is to be modified relative to a prior frame.

In system 200, emotion vector 204 and/or style vector 222 are fed into articulation network 210 at multiple levels, including at least a beginning and an end of the network to help condition the network. Articulation network 210 may use a shared audio encoder and one or more (e.g., multiple) decoders for each facial component (e.g., face skin, jaw, tongue, eyeballs and head). During training, an output network 212 can generate output 214 that includes a set of head/jaw displacements, eyeball rotations, skin/tongue vertex positions, and/or motion vectors (or other motions or deformations) for individual feature points of the facial components, whether for each such feature point or for only those that have changed relative to a prior frame, among other such options. During training, output 214 can be compared against "ground truth" data, such as the original reconstructed facial data from the (e.g., 4D) image capture, in order to compute an overall loss value. In at least one embodiment, a loss such as an L2 loss can be used for both position and velocity of feature points in an output data representation. A loss function used to determine the loss value can include terms for position, motion, and adversarial loss in at least one embodiment. This loss value can be used during backpropagation to update network parameters (e.g., weights and biases) for output network 212, articulation network 210, and/or analysis network 208. Once output network 212, articulation network 210, and/or analysis network 208 are determined to converge to an acceptable or desired level of accuracy or precision, and/or another training end criterion is satisfied (e.g., processing all training data or performing a target or maximum number of training iterations), the trained output network 212, articulation network 210, and/or analysis network 208 can be provided or deployed for inferencing.

After training of output network 212, articulation network 210, and/or analysis network 208 is complete, system 200 may receive audio data (e.g., only audio data in some embodiments) spanning audio window 202 as input, and may infer output 214 for various facial components (e.g., head, face, eyeballs, jaw, tongue), which can then be fed to a renderer 216 (e.g., a rendering engine of an animation or video synthesis system) in order to generate a frame of animation 218, which may be one of a series of frames that provide the animation upon presentation or playback. As discussed in more detail herein, emotion labels 204 and/or style vector 222 data may also be provided as input to system 200 if the generated output 214 is to be modified in some way with respect to how system 200 would otherwise infer the vertex positions based on the audio data, such as to convey a specific style or facial behavior to be used in inferring output 214.

In some embodiments, a generative neural network such as a generative adversarial network (GAN) can be used to directly infer image data. One or more components of system 200 can output a vector that encodes position or motion data for various points on a mesh for one or more facial components, and can feed this output vector (or another output, such as a global transformation matrix) to a renderer 216 that can apply these values to one or more meshes for this character in order to guide the animation. This output matrix or vector can have a dimension that matches the features of the facial components, as may include, for example and without limitation, 272 facial feature points for the skin, five for the head, five for the jaw, two for the eyeballs, ten for the tongue (using PCA compression, for example), and so on. Such an approach can provide a sufficiently smooth animation, such that additional smoothing or post-processing will not be needed in at least many situations. A system may, however, allow for additional smoothing to be applied, such as where a user may be able to specify one or more smoothing parameters.

In at least one embodiment, an auto-correlation feature can be extracted from the audio data in audio window 202 for a current frame, and this feature can be fed into system 200. The size and/or stride of audio window 202 can be any appropriate or suitable value and may depend in part upon the implementation, but at a minimum can include a period of time corresponding to a frame of animation for a target frame rate (e.g., 60 Hz), and can include larger windows to consider portions of audio for nearby frames (e.g., prior or subsequent) and/or provide for more accurate and smooth animation, as well as more accurate emotion and/or style determination from the input audio. An example system 200 can use one-hot vector encoding to represent different emotions, or emotional labels, with the resulting emotion vectors can be concatenated at the beginning and the end layer of the U-Net.

In at least one embodiment, output 214 can include data specifying motion for different facial parts or components. Output 214 may include data for components of a character beyond just facial components as well, as may relate to arms, legs, torso, and the like. System 200 may also generate accurate motion data for a character for frames or scenes where a face of the character is not visible, or is only partially represented in the scene. For facial parts with non-rigid deformation such as skin and tongue, captured (e.g., 4D) motion data can be compressed using, for example, Principal Components Analysis (PCA). This can allow a facial mesh with a large number of points, such as 60,000 points, to be represented by a vector of a much smaller dimension. In such embodiments, the PCA weight vectors can be used as a training representation. In one embodiment, a fully connected layer can fuse emotion and/or style data into a smaller vector, which can be inserted as a concatenation into individual layers of the network.

For facial parts with rigid transforms, such as head and teeth, a number (e.g., without limitation, 5) of markers or feature points can be selected or identified on the target mesh, and a position delta of these points from the reference position can be used as a training representation from which a rigid transform matrix can be computed. For a jaw, these five feature points may include points at either end of the jaw, a center point, and two intermediate reference points, where those intermediate points may not be necessary but can help with fine motion control and noise reduction. For rotatable components such as eyeballs, system 200 can use two rotation values (e.g., pitch and yaw) to represent horizontal and vertical rotations relative to a default orientation. At runtime, or during inferencing, full 3D facial animation output 214 can be obtained by system 200. System 200 can also allow for interactive control of emotion or style of this speech animation by feeding different emotion vectors 204 and/or style vectors 222 into articulation network 210, in order to allow for modifying or "fine-tuning" the motion of individual each facial components and facial regions, as may be part of a real-time or near-real time process, or as post-process.

In at least one embodiment, a deep neural network can include a U-Net-based architecture. A U-Net-based architecture can take as input a sequence of audio, such that smoothness of facial animation will be provided through the context of the input. In another embodiment, the network can have a per-frame convolutional neural network (CNN)-based architecture. A per-frame CNN architecture can receive as input audio windows of, for example and without limitation, about 0.5 seconds, which can include data for prior and sequent frames in a sequence, whereby the CNN can predict data for a middle frame in this sequence. In yet another embodiment, the network can have a recurrent neural network (RNN)-based architecture.

An RNN-based architecture may receive as input a smaller window of data and works with a shorter delay in real-time or near real-time applications, such as for only 0.15 seconds of delay, and can predict motion based, at least in part, upon what was observed previously within this window. Other architectures can be used as well within the scope of the various embodiments, which can also provide for a smoothness of animation based at least in part upon a context provided to, or determined by, those architectures. While different architectures may provide adequate results, certain architectures may perform better under certain circumstances or for certain aspects of speech- or audio-driven facial animation. For example, a U-Net-based architecture was found to be highly accurate for very strong emotions with large deformations or motions, and demonstrated very smooth temporal motion. A CNN-based architecture performed well for real-time inferencing, and can generate very reliable lip synchronization motions. An RNN-based architecture was shown to perform well for real-time or near real-time applications, with small latency, and demonstrated a greater relative variability in upper face motion.

In at least some embodiments, given audio window 202, a task of system 200 is to infer the facial expression at the center of audio window 202. This expression can be represented directly as per-vertex difference vectors from a neutral pose in a fixed-topology face mesh. Once analysis network 208, articulation network 210, and/or output network 212 are trained, the mesh can be animated by sliding audio window 202 with a certain stride (e.g., a stride that reflects the frame rate associated with the facial animation) over a vocal audio track and using analysis network 208, articulation network 210, and/or output network 212 to independently evaluate audio window 202 at each time step. While analysis network 208, articulation network 210, and/or output network 212 may have no memory of past animation frames, temporally stable results can be produced in practice.

An example and non-limiting CNN-based deep neural network consists of one special-purpose layer, ten convolutional layers, and two fully-connected layers, which may be divided into analysis network 208, articulation network 210, and output network 212 as illustrated in FIG. 2. Data for an input audio window 202 can be fed to analysis network 208 to produce a time-varying sequence of speech features that will subsequently drive articulation. Analysis network 208 can first extract raw formant information using fixed-function autocorrelation analysis, then refine it with a number (e.g., 5) of convolutional layers. Through training, the convolutional layers learn to extract short-term features that are relevant for facial animation, such as intonation, emphasis, and specific phonemes. Their abstract, time-varying representation can be the output of the final convolutional layer.

The result can be fed to articulation network 210 that includes, without limitation, five additional convolutional layers that analyze the temporal evolution of the features and eventually decide on a single abstract feature vector that describes the facial pose at the center of audio window 202. As a secondary input, articulation network 210 accepts a (learned) description of emotional state (e.g., emotion labels 204) and/or style (e.g., style vector 222) to disambiguate between different facial expressions and speaking styles. The emotional state, alone or with style data, can be represented as an E-dimensional vector that is concatenated directly onto the output of each layer in the articulation network, enabling the subsequent layers to alter their behavior accordingly.

In at least one embodiment, each layer 1 outputs Fl×Wl× Hl activations, where Fl is the number of abstract feature maps, WI is dimension of the time axis, and Hl is the dimension of the formant axis. Strided 1×3 convolutions can be used in analysis network 208 to gradually reduce Hl while increasing Fl, e.g., to push raw formant information to the abstract features, until Hl=1 and Fl=256 at the end. Similarly, 3×1 convolutions can be used in articulation network 210 to decrease WI, e.g., to subsample the time axis by combining information from the temporal neighborhood. Specific parameters can be chosen that consistently perform well while leading to reasonable training times. The results are not hugely sensitive to the exact number of layers or feature maps, but it may be beneficial in some systems to organize the convolutions in two distinct phases to avoid overfitting. Analysis network 208 can perform the same operation at every point along the time axis, in order to benefit from the same training samples at different time offsets.

An example articulation network 210 can output a set of 256+E+S abstract features that together represent the desired facial pose—e.g., E for the dimension of the emotion vector and S for the dimension of the style vector. These features can be fed to output network 212 to produce animation output 214 that includes the final 3D positions of a set of control vertices in a tracking mesh. Output network 212 can be implemented as a pair of fully connected layers that perform a simple linear transformation on the data. The first layer maps the set of input features to the weights of a linear basis, and the set of second layers calculate the final PCA coefficients for face and tongue, rotation values for eyeballs, and the translational displacements for jaw and head. The second layer can be initialized to, for example, 150 precomputed PCA components that together explain approximately 99.9% of the variance seen in the training data.

A primary input to system 200 can include a speech audio signal, which may be converted to a format such as 16 kHz mono audio. The volume of each vocal track can be normalized to use a full [−1,+1] dynamic range, but such a system may or may not employ other kinds of processing, such as dynamic range compression, noise reduction, or pre-emphasis filter. An autocorrelation layer can convert the input audio window to a compact 2D representation for the subsequent convolutional layers. The resonance frequencies (formants) of the linear filter can carry essential information about the phoneme content of the speech. The excitation signal indicates the pitch, timbre, and other characteristics of the speaker's voice, which may be less important for facial animation, such that a system can focus, at least to some extent, on the formants to improve the generalization over different speakers.

An approach to performing source-filter separation can be based, at least in part, on linear predictive coding (LPC). LPC breaks the signal into several short frames, solves the coefficients of the linear filter for each frame based on the first K autocorrelation coefficients, and performs inverse filtering to extract the excitation signal. The resonance frequencies of the filter are entirely determined by the autocorrelation coefficients, at least some of the processing steps can be skipped and the system can use the autocorrelation coefficients directly as a representation of the instantaneous formant information. The representation can be appropriate for convolutional networks, as the layers can easily learn to estimate the instantaneous power of specific frequency bands.

In one example implementation, 520 ms worth of audio was used as input, e.g., as 260 ms of past and future samples with respect to the desired output pose. This value was chosen to capture relevant effects, such as phoneme coarticulation, without providing too much data that might lead to overfitting. The input audio window 202 can be divided into 64 audio frames with 2× overlap, so that each frame corresponds to 16 ms (256 samples) and consecutive frames are located 8 ms (128 samples) apart. For each audio frame, the DC component can be removed and a Hann window applied to reduce temporal aliasing effects. Finally, K=32 autocorrelation coefficients can be calculated to yield a total of 64×32 scalars for the input audio window 202. Although much fewer autocorrelations, e.g., K=12, would suffice to identify individual phonemes, an approach can choose to retain more information about the original signal to allow the subsequent layers to also detect variations in pitch.

Inferring facial animation from speech can be an inherently ambiguous problem because the same sound can be produced with very different facial expressions. This is especially true with the eyes and eyebrows, which have no direct causal relationship with sound production. Such ambiguities are also problematic for deep neural networks, because the training data will inevitably contain cases where nearly identical audio inputs are expected to produce very different output poses. If a network has nothing else to work with besides the audio, it will learn to output the statistical mean of the conflicting outputs.

An example approach to resolve such ambiguities is to introduce at least a secondary input. A small amount of additional, latent data can be associated with each training sample to provide enough information for analysis network 208, articulation network 210, and/or output network 212 to unambiguously infer the correct output pose. This additional data can encode all relevant aspects of the animation in the neighborhood of a given training sample that cannot be inferred from the audio itself, including different facial expressions and coarticulation patterns. This secondary input can include a predefined label, and may represent at least an emotional state of the actor. Besides resolving ambiguities in the training data, such secondary input can also be highly useful for inference, as it enables a system to mix and match different emotional states with a given vocal track to provide powerful control over the resulting animation.

In addition to or alternatively from relying on predefined labels, system 200 can adopt a data-driven approach where analysis network 208, articulation network 210, and/or output network 212 automatically learn a succinct representation of style as a part of the training process. This allows system 200 to extract meaningful emotional states even from in-character footage, as long as a sufficient range of emotions is present. In at least one embodiment, a style state can be represented by an S-dimensional style vector 222, where S is a tunable parameter that can be set to a value such as, without limitation, 16 or 24, and the components initialized to random values drawn from a Gaussian distribution. One such vector can be allocated for each training sample, with the matrix that stores these latent variables being referred to herein as a style database. The style data can be appended to the list of activations of all layers of articulation network 210, which can make it a part of the computation graph of the loss function and, as a trainable parameter, it can be updated along with the network weights during backpropagation. The dimensionality of S is a tradeoff between two effects in this example. If S is too low, the styles fail to disambiguate variations in the training data, leading to weak audio response. If S is too high, styles may become too specialized to be useful for general inference.

Information provided by the input audio can be limited to short-term effects within the, e.g., 520 ms interval by design. Consequently, a natural way to prevent the styles from containing duplicate information is to forbid them from containing short-term variation. Having the styles focus on longer-term effects may also be desirable for inference, as it may be desirable for the network to produce reasonable animation even when the emotional state remains fixed. This requirement can be expressed by introducing a dedicated regularization term in the loss function to penalize quick variations in the style database, which can lead to incremental smoothing of the emotional states over the course of training. One potential limitation to such an approach is that aspects such as blinking and eye motion may not be able to be modeled correctly since they do not correlate with the audio and cannot be represented using the slowly varying emotional state.

In some embodiments, the emotional and style state may be appended to all layers of articulation network 210 to help to improve the results significantly in practice, as the emotional and style state can control the animation on multiple abstraction levels, and the higher abstraction levels may be more difficult to learn. Connecting to the earlier layers provides nuanced control over subtle animation features such as coarticulation, whereas connecting to the later layers provides more direct control over the output poses. The early stages of training can concentrate on the latter, while the later stages can concentrate on the former once the individual poses are reasonably well represented.

In one approach to training analysis network 208, articulation network 210, and/or output network 212, an unstructured mesh with texture and optical flow data can be reconstructed from the, e.g., nine images captured for each frame. A fixed-topology template mesh, created prior to the capture work using a separate photogrammetry pipeline, can be projected on to the unstructured mesh and associated with the optical flow. The template mesh can be tracked across the performance and any issues are fixed semi-automatically, such as in software by a tracking artist. The position and orientation of the head can be stabilized using a few key vertices of the tracking mesh. Finally, the vertex positions of the mesh can be exported for each frame in the shot. These positions—or more precisely the deltas from a neutral pose—can be target outputs of this network when given a window of audio during training.

For each actor, a training set can consist of at least two parts: pangrams and in-character material. In general, the inference quality may increase as the training set grows, but a small training set may be highly desirable due to the cost of capturing high-quality training data. In at least one embodiment, it was empirically determined that around three to five minutes per actor represents a practical sweet spot. A pangram set can attempt to cover the set of possible facial motions during normal speech for a given target language, such as English. The actor speaks one to three pangrams, e.g., sentences that are designed to contain as many different phonemes as possible, in several different emotional tones to provide a good coverage of the range of expression. An in-character material set can leverage the fact that an actor's performance of a character is often heavily biased in terms of emotional and expressive range for various dramatic and narrative reasons. In the case of a movie or a game production, this material can be composed of the preliminary version of the script. Only the shots that are deemed to support the different aspects of the character can be selected to ensure that the trained network produces output that stays in character even if the inference is not perfect, or if completely novel or out of character voice acting is encountered.

Given the potentially ambiguous nature of the training data, effort can be made to define a meaningful loss function to be optimized. In at least one embodiment, a specialized loss function can be used that consists of three distinct terms: a position term to ensure that the overall location of each output vertex is roughly correct, a motion term to ensure that the vertices exhibit the right kind of movement under animation, and a regularization term to discourage the style database from containing short-term variation.

Simultaneous optimization of multiple loss terms may be difficult in practice, because the terms can have wildly different magnitudes and their balance may change in unpredictable ways during training. One solution is to associate a pre-defined weight with each term to ensure that none of them gets neglected by the optimization. However, choosing optimal values for the weights can be a tedious process of trial and error that may need to be repeated whenever the training set changes. To overcome these issues, a normalization scheme can be used that automatically balances the loss terms with respect to their relative importance. As a result, an equal amount of effort can be devoted to optimizing each term, such that there is no need to specify any additional weights.

One error metric that can be used is the mean of squared differences between the desired output y and output 214 § produced by output network 212. For a given training sample x, this can be expressed using position term P(x):

$$P(x) = \frac{1}{3V}\Sigma_{i=1}^{3V}\big(y^{(i)}(x) - \hat{y}^{(i)}(x)\big)^2 \tag{1}$$

Here, V represents the total number of output features including skin/tongue PCA coefficients, rotation values of eyeballs, and translation displacement for jaw/head, and $y^{(i)}$ denotes the ith scalar component of $y=(y^{(1)}, y^{(2)}, \ldots, y^{(3V)})$. The total number of output components in this example is 3V, because this network outputs the full 3D position for each vertex. Even though the position term ensures that the output of the network is roughly correct at any given instant in time, it may not be sufficient to produce high-quality animation in all instances. It was observed that training the network with the position term alone may lead to a considerable amount of temporal instability, and the response to individual phonemes is generally weak. Accordingly, analysis network 208, articulation network 210, and/or output network 212 can be optimized in terms of vertex motion as well: a given output vertex should only move if it also moves in the training data, and it should only move at the right time. System 200 can thus address vertex motion as a part of the loss function.

One approach for training neural networks is to iterate over the training data in minibatches, where each minibatch consists of B randomly selected training samples $x_1$, $x_2, \ldots, x_B$. To account for vertex motion, samples can be drawn as B/2 temporal pairs, each consisting of two adjacent frames. Operator m[·] can be defined as the finite difference between the paired frames, which allows defining motion term M(x) as:

$$M(x) = \frac{2}{3V}\sum_{k=1}^{V}\big(m\big[y^i(x)\big] - m\big[\hat{y}^{(i)}(x)\big]^2\big) \tag{2}$$

In this equation, the factor 2 appears because M is evaluated once per temporal pair.

In addition, it can be beneficial to ensure that the network correctly attributes short-term effects to the audio signal and long-term effects to the emotional state. One approach can define a regularization term for the emotion/style database using the same finite differencing operator as above:

$$R'(x) = \frac{2}{E}\Sigma_{i=1}^{E}m\big[e^{(i)}(x)\big]^2 \tag{3}$$

15                                                    16

Here, $e^{(i)}(x)$ denotes the ith component stored by the
emotion database for training sample x. It can be noted
that this definition does not explicitly forbid the emo-
tion/style database from containing short-term varia-
tion—it instead discourages excess variation on aver-
age. This may be significant in at least some instances,
as the training data may contain legitimate short-term
changes in the emotional state occasionally, and it may
be undesirable for analysis network 208, articulation
network 210, and/or output network 212 to incorrectly
try to explain them based on the audio signal.

A caveat with Eq. 3 is that R'(x) can be brought arbitrarily
close to zero by simply decreasing the magnitude of e(x)
while increasing the corresponding weights in analysis net-
work 208, articulation network 210, and/or output network
212. Drawing on the idea of batch normalization, this trivial
solution can be removed by normalizing R(x) with respect to
the observed magnitude of e(x):

$$R(x) = \frac{R'(x)}{\left(\frac{1}{EB}\Sigma_{i=1}^{E}\Sigma_{j=1}^{B}e^i(x_j)^2\right)} \tag{4}$$

To balance these three loss terms, one approach is to
leverage the properties of an Adam (or other) optimization
method used for training analysis network 208, articulation
network 210, and/or output network 212. In effect, Adam
updates the weights of the network according to the gradient
of the loss function, normalized in a component-wise fash-
ion according to a long-term estimate of its second raw
moment. The normalization makes the training resistant to
differences in the magnitude of the loss function, but this is
only true for the loss function as a whole—not for the
individual terms. One approach is to perform similar nor-
malization for each loss term individually. Using the posi-
tion term as an example, the second raw moment of P(x) can
be estimated for each minibatch and a moving average $v^P_t$
maintained across consecutive minibatches, as may be given
by:

$$v_t^p = \beta.v_{t-1}^p + (1-\beta).\frac{1}{B}\sum_{j=1}^{B}P(x_j)^2 \tag{5}$$

Here, t denotes the minibatch index and β is a decay
parameter for the moving average that may be set to a value
such as, without limitation, 0.99. The system can initialize $$v_t^p = 0$$

and correct the estimate to account for startup bias to get $$v_t^p = v_t^p/(1-\beta^t).$$

The average P(x) can then be calculated over the current
minibatch and the value normalized according to $$v_t^p:$$

$$\ell^P = \frac{\left(\frac{1}{B}\Sigma_{j=1}^{B}P(x_j)\right)}{\left(\sqrt{\hat{v}_t^p}+\epsilon\right)} \tag{6}$$

In Equation 6, e is a small constant that can be set to a
value such as $10^{-8}$ to avoid division by zero. Repeating
Equations 5 and 6 for M(·) and R(·), a final loss function
can be expressed as a sum over the individual
terms $\ell = \ell^P + \ell^M + \ell^R$. In some embodiments, there may
be further fine-tuning of the importance of the loss
terms through additional weights.

In at least one embodiment, random time-shifting can be
employed for training samples to improve temporal stability
and reduce overfitting. Whenever a minibatch is presented to
analysis network 208, articulation network 210, and/or out-
put network 212, the input audio window can be randomly
shifted by up to 16.6 ms in either direction (±0.5 frames at
30 FPS). To compensate, the same shift can be applied for
the desired output pose through linear interpolation. Both
training samples in a temporal pair can be shifted by the
same amount, with different random shift amounts being
used for different pairs. In some embodiments, cubic inter-
polation of outputs instead of or in addition to linear
interpolation may be used.

To improve generalization and avoid overfitting, multi-
plicative noise can be applied to the input of individual
convolutional layers. The noise can have the same magni-
tude for every layer, and can be applied on a per-feature map
basis so that all activations of a given feature map are
multiplied by the same factor. Identical noise can be applied
to paired training samples to get a meaningful motion term.
One formula for this noise is $1.4^{N(0,\ 1)}$. There may be no
other type of noise or augmentation applied to the training
samples besides the time-shifting of input/outputs and mul-
tiplicative noise inside analysis network 208, articulation
network 210, and/or output network 212. Some approaches
may, however, perform operations such as adjusting the
volume, adding reverb (both long and short), performing
time-stretching and pitch-shifting, applying non-linear dis-
tortion, random equalization, and scrambling the phase
information, among other such options.

Once trained, analysis network 208, articulation network
210, and/or output network 212 can be evaluated at arbitrary
points in time by selecting the appropriate audio window
202 and/or stride, leading to facial animation at the desired
frame rate. The latency of such an approach may depend, at
least in part, upon the audio window size, which may reach
a period of time into the past and/or the future. Coarticula-
tion can set a lower bound for the look-ahead; it has been
observed that the look-ahead can be limited to a values such
as 100 ms during training with little degradation in quality,
even though some coarticulation effects may be longer.
Shortening the look-ahead further than this may lead to a
quick drop in perceived responsiveness in certain instances,
so a realistic lower bound for the latency of one embodiment
can be set to around 100 ms.

When inferring the facial pose for novel audio, analysis
network 208, articulation network 210, and/or output net-
work 212 can be supplied with emotional state vector 204
and/or style vector 222 as a secondary input, which may also
be part of a single emotion vector. As part of training, one
or more of these networks can learn a vector (e.g., a latent
E-dimensional vector) for each training sample, and this
emotion database can be used to obtain robust emotion
vectors that can be used during inference.

During training, analysis network 208, articulation network 210, and/or output network 212 can attempt to separate out the latent information—e.g., everything that is not inferable from the audio alone-into an emotion/style database. However, this decomposition may result in some amount of crosstalk between articulation and the overall expression. In practice, many of the learned emotion/style vectors may only be applicable in the neighborhood of their corresponding training frames and are not necessarily useful for general inference. In at least one embodiment, a process can mine for robust emotion/style vectors using a three-step process. A problem experienced in many learned emotion vectors is that they deemphasize the motion of the mouth: when such a vector is used as a constant input when performing inference for novel audio, the apparent motion of the mouth may be subdued. One approach is to pick a few audio windows from a validation set that contain bilabials and a few that contain vowels, for which the mouth should be closed and open, respectively. The emotion/style database can then be scanned for vectors that exhibit the desired behavior for all chosen windows. Performing this preliminary culling for Character 1 resulted in 100 candidate emotion vectors for further consideration, and this response can vary with different emotion vectors.

A second operation in this example culling process is to play back the validation audio tracks and inspect the facial motion inferred with each of the candidate emotion/style vectors. At this stage, vectors can be discarded that result in subdued or spurious, unnatural motion, indicating that the vector may be tainted with short-term effects. This stage narrowed the set to 86 candidate emotion vectors for Character 1. As a third and final operation in this example, inference can be run on several seconds of audio from a different speaker and vectors with muted or unnatural response eliminated. With Character 1, this step left 33 emotion vectors.

The resulting output 214 can be examined for several novel audio clips with every remaining emotion/style vector, and a semantic meaning (e.g., "neutral", "amused", "surprised", etc.) assigned to each of them, depending at least in part on factors such as the emotional state they convey. Which semantic emotions remain can depend on the training material, and it may not be possible to extract, e.g., a "happy" emotion if the training data does not contain enough such material to be generalizable to novel audio. Even after removing all but the best performing emotion vectors there can still be substantial variation to choose from. It was observed that emotion vectors mined in this way behave well under interpolation, e.g., sweeping from one emotion vector to another tends to produce natural-looking results. It therefore may be possible to vary the emotional state during inference based on high-level information from a game engine, or by manual keyframing.

The resulting facial animation can be highly stable. Primary sources of this temporal stability can include the motion term $\ell M$ and time-shift augmentation, but even with these techniques there may be still a small amount of jitter left, such as in the lip area at 4 ms timescale for some inputs. This may result from aliasing between neighboring audio frames around features such as stops and plosives. This can be mitigated, at least in part, using at least some amount of ensembling: analysis network 208, articulation network 210, and/or output network 212 are evaluated twice for a given animation frame, a time (e.g., 4 ms) apart, and the predictions are averaged.

As mentioned, such an approach can also support retargeting. When training the model, output network 212 may become specialized for a particular mesh. For many operations, it may be desirable to drive several different meshes using audio input. Approaches discussed herein can support retargeting of deformation, or transfer of deformation behavior between characters, or for the same character at different stages in life, among other such options.

As shown in FIG. 2, detection engine 122 determines a speech rate 232 associated with audio input within a given audio window 202. For example, detection engine 122 may use a neural network and/or another type of audio-processing component to detect a number of phonemes, a number of transitions between phonemes, and/or another measure of speech rate 232 within an audio segment spanning a 0.5-second audio window 202. Detection engine 122 may also, or instead, compute speech rate 232 as an exponential moving average and/or another aggregation of individual measures of speech rate (e.g., number of phonemes, number of transitions between phonemes, etc.) across one or more audio windows that span a given time interval within the audio input.

Detection engine 122 compares the detected speech rate 232 with one or more thresholds 234 representing various speech rates that are higher than a (e.g., predefined) normal speech rate. If the detected speech rate 232 meets or exceeds a given threshold, the detected speech rate can be determined to be at or above the high speech rate represented by the threshold. If the detected speech rate falls below all thresholds 234, the detected speech rate can be determined to correspond to a normal speech rate.

When detection engine 122 determines that speech rate 232 for a given audio segment falls below all thresholds 234, detection engine 122 transmits features 236 generated by analysis network 208 from the audio segment to articulation network 210. As discussed herein, articulation network 210 processes the transmitted features 236 along with emotion label 204 and/or style vector 222 at multiple levels. Articulation network 210 generates abstract features that represent the desired facial pose, which are fed to output network 212 to produce animation output 214 corresponding to the audio segment.

When the speech rate within a given audio segment is determined to exceed a given threshold, detection engine 122 transmits features 236 generated by analysis network 208 from the audio segment to processing engine 124. Processing engine 124 converts features 236 to a corresponding set of upsampled features 238 and extracts a subset of upsampled features 238 as a set of cropped features 240.

For example, processing engine 124 may perform bilinear upsampling of 25 features 236 to generate upsampled features 238 that are greater in number than features 236 by a certain factor or multiple. Processing engine 124 may also extract cropped features 240 as 25 contiguous features (or a different number of contiguous features) from the temporal "center" of upsampled features 238 (e.g., a subset of upsampled 238 features that are flanked on both sides by substantially the same amount of additional upsampled features 238). Processing engine 124 may then provide cropped features 240 as input into articulation network 210 for additional processing by articulation network 210 and output network 212. Because cropped features 240 generated by processing engine 124 are equal in number to the original set of features 236 outputted by analysis network 208, these cropped features 240 can be inputted into articulation network 210 without requiring additional modification to articulation network 210.

When detection engine 122 applies multiple thresholds 234 to speech rate 232 for a given audio segment, processing engine 124 can generate upsampled features 238 and/or cropped features 240 based on the highest threshold met or exceeded by that audio segment. For example, thresholds 234 may include a first threshold for a speech rate that is 1.5 times higher than a "normal" speech rate, a second threshold for a speech rate that is double that of a normal speech rate, and a third threshold for a speech rate that is triple that of a normal speech rate. The first, second, and third thresholds 234 may be associated with upsample factors of 1.5, 2, and 3, respectively, to account for the differences in speech rate represented by these thresholds 234. When an audio segment exceeds only the first threshold, processing engine 124 may use the upsample factor of 1.5 for the first threshold to convert 25 features 236 generated by analysis network 208 into 37 or 38 upsampled features 238. Processing engine 124 may then generate cropped features 240 by extracting 25 upsampled features 238 from the temporal center of these upsampled features 238 (e.g., the 7th to the 31st elements from a vector of 37 upsampled features 238).

Continuing with the above example, when an audio segment exceeds both the first and second thresholds 234 but not the third threshold, processing engine 124 may use the upsample factor of 2 for the second threshold to convert 25 features 236 generated by analysis network 208 into 50 upsampled features 238. Processing engine 124 may then generate cropped features 240 by extracting 25 upsampled features 238 from the temporal center of these upsampled features 238 (e.g., the 13th to the 37th elements from a vector of 50 upsampled features 238).

Continuing with the above example, when an audio segment exceeds all three thresholds 234, processing engine 124 may use the upsample factor of 3 for the third threshold to convert 25 features 236 generated by analysis network 208 into 75 upsampled features 238. Processing engine 124 may then generate cropped features 240 by extracting 25 upsampled features 238 from the temporal center of these upsampled features 238 (e.g., the 26th to the 51st elements from a vector of 75 upsampled features 238).

After processing engine 124 generates cropped features 240, processing engine 124 inputs cropped features 240 into articulation network 210 as a substitute for the original set of features 236 generated by analysis network 208. In providing cropped features 240 as input into articulation network 210 instead of features 236, detection engine 122 and processing engine 124 allow articulation network 210 and output network 212 to generate output 214 that corresponds to a phoneme that is found within the center portion of the audio segment. Consequently, detection engine 122 and processing engine 124 can avert the generation of an overly "smooth" animation and/or a facial shape that is in between two or more facial shapes for two or more phonemes when speech rate 232 is indicative of multiple phonemes within audio window 202.

Figure 3:
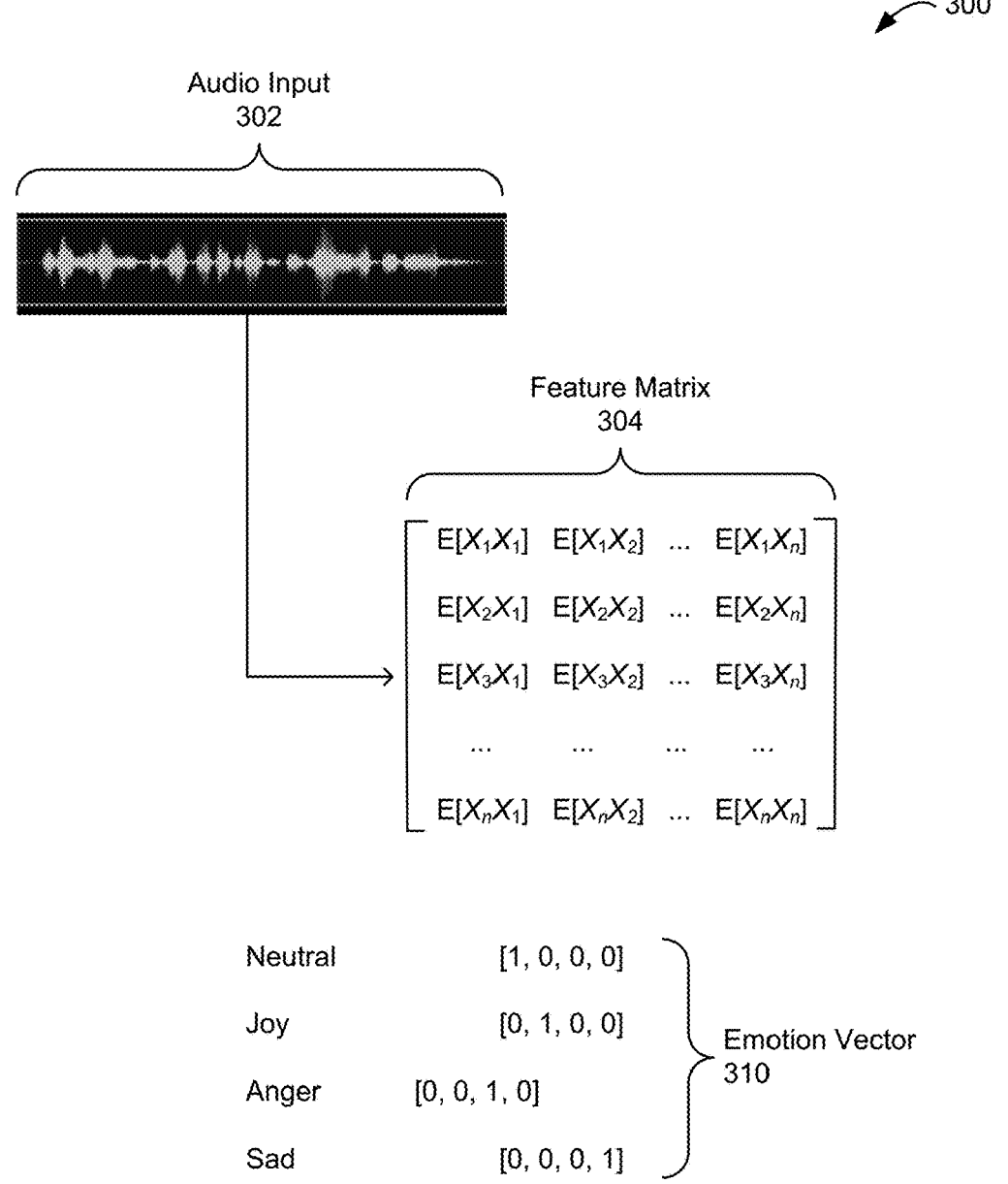
FIG. 3 illustrates an approach to representing data for use in generating animation, according to various embodiments.

FIG. 3 illustrates example input vectors 300, including audio and emotion vectors, that can be provided as input in at least one embodiment. In this example, an audio input 302 can be received, including audio data over at least a window of time. This audio input 302 can be used to generate an audio vector generated from features extracted from the audio. As mentioned, this can include performing an audio auto-correlation extraction which can generate an audio feature matrix 304 as illustrated in FIG. 3, and these values can be used to generate an audio vector for input to the deep neural network. Similarly, a set of emotional labels may be presented that can each be represented as a vector-such that one may be provided in place of the other in examples presented or described herein. In this example, an emotion vector 310 can indicate which emotion to convey (or is conveyed for training purposes) in a frame of audio, where here a single emotion is indicated by setting the value for that feature in the vector to 1, and the value for all other emotion feature to 0. Various other values, or collections of values, can be used in other embodiments as well. In some instances, the emotional vector can be a blended vector 320 that represents a blended emotional state. In this example, the blended vector includes a value of 0.65 for the emotion "joy," and 0.35 for the emotion "sad." Here, where the values add up to a total of 1, to represent 100% of the emotional state, this indicates that the emotional state is 65% joy and 35% sad. As discussed elsewhere herein, these weightings do not have to add up to 100% in total, and instead each emotion can be set to a value between 0% and 100%, or another such value. Thus, a sadness value of 100% and a joy value or 100% in one system might equal a sadness value of 0.5 and a joy value of 0.5, among other such options, to indicate equal amounts of each emotion contributing to the overall emotional state.

In some embodiments, a style vector may be used to encode the residual facial expressions that are not as clearly represented by the audio input and the emotion labels. For example, a style vector may include values to be applied (directly or indirectly) to specific facial components or feature points, such as to cause a character to raise his or her upper lip more in one direction when talking. A neural network may learn specific style features during a training process to use for a style vector as well, among other such options, such as those discussed in more detail later herein.

Figure 4:
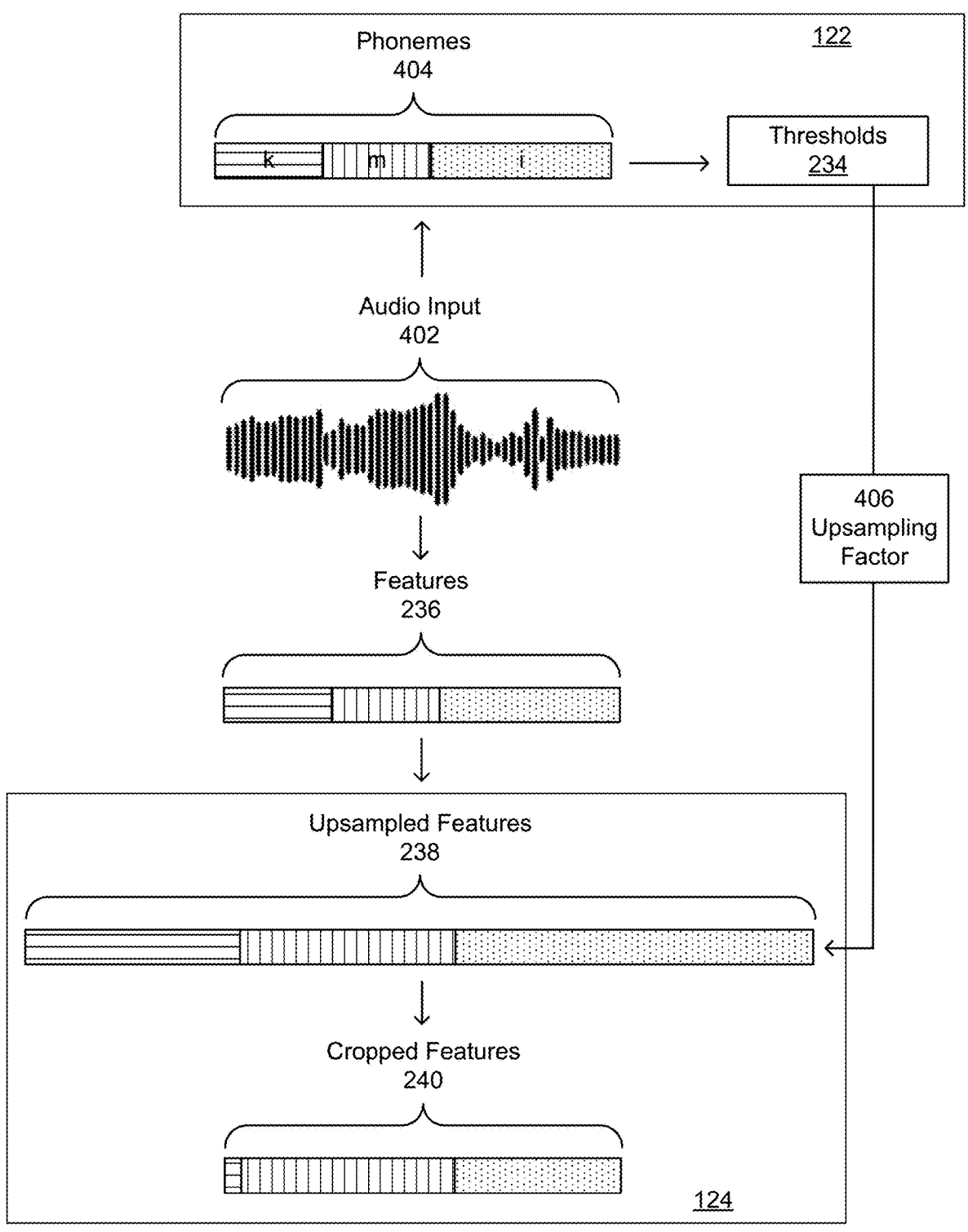
FIG. 4 illustrates the processing of an example audio input by the detection engine and processing engine of FIG. 1, according to various embodiments.

FIG. 4 illustrates the processing of an example audio input 402 by detection engine 122 and processing engine 124 of FIG. 1, according to various embodiments. As shown in FIG. 4, detection engine 122 processes audio input 402 spanning a given audio window to determine a sequence of phonemes 404 within audio input 402. For example, detection engine 122 may execute a deep neural network that is trained to perform phoneme detection to extract phonemes 404 of "k," "m," and "i" from audio input 402.

Detection engine 122 also uses the number of detected phonemes 404 in audio input 402 as an indication of speech rate 232 and applies one or more thresholds 234 to speech rate 232. For example, detection engine 122 may use numeric thresholds 234 for the number of phonemes within an audio window to determine whether or not the number of phonemes 404 detected in audio input 402 is indicative of a "higher than normal" speech rate 232. As discussed herein, detection engine 122 can also, or instead, use a different measure (e.g., the number of transitions between phonemes) and/or a combination of measures with corresponding thresholds 234 to determine whether or not audio input 402 includes a higher than normal speech rate 232.

In the example of FIG. 4, detection engine 122 determines that the number of phonemes 404 detected in audio input 402 exceeds one or more thresholds 234. Detection engine 122 also determines an upsampling factor 406 corresponding to the largest threshold exceeded by the number of detected phonemes 404. Detection engine 122 further transmits a set of features 236 extracted from audio input 402 by analysis network 208 and upsampling factor 406 to processing engine 124.

Processing engine 124 upsamples features 236 by upsampling factor 406 to generate a corresponding set of upsampled features 238. For example, processing engine 124 may perform bilinear upsampling of features 236 using a value of 2 for upsampling factor 406 to convert 25 features 236 into 50 upsampled features 238. During this bilinear upsampling, processing engine 124 may convert a first audio feature vector that includes 7 features 236 associated with the "k" phoneme, 7 features 236 associated with the "m" phoneme, and 11 features associated with the "i" phoneme into a second audio feature that includes 14 features 236 associated with the "k" phoneme, 14 features 236 associated with the "m" phoneme, and 22 features associated with the "i" phoneme.

Processing engine 124 then generates cropped features 240 by extracting a subset of temporally central upsampled features 238. Continuing with the above example, processing engine 124 may generate cropped features 240 by extracting, from upsampled features 238, the last 2 features 236 associated with the k" phoneme, all 14 features 236 associated with the "m" phoneme, and the first 11 features associated with the "i" phoneme.

Processing engine 124 may then provide cropped features 238 as input into articulation network 210. Because the majority of cropped features 238 are associated with the middle "m" phoneme, articulation network 210 and output network 212 may be able to convert cropped features 238 into a more accurate facial animation than if the original set of features 236 associated with all three phonemes 404 were provided as input into articulation network 210.

Figure 5:
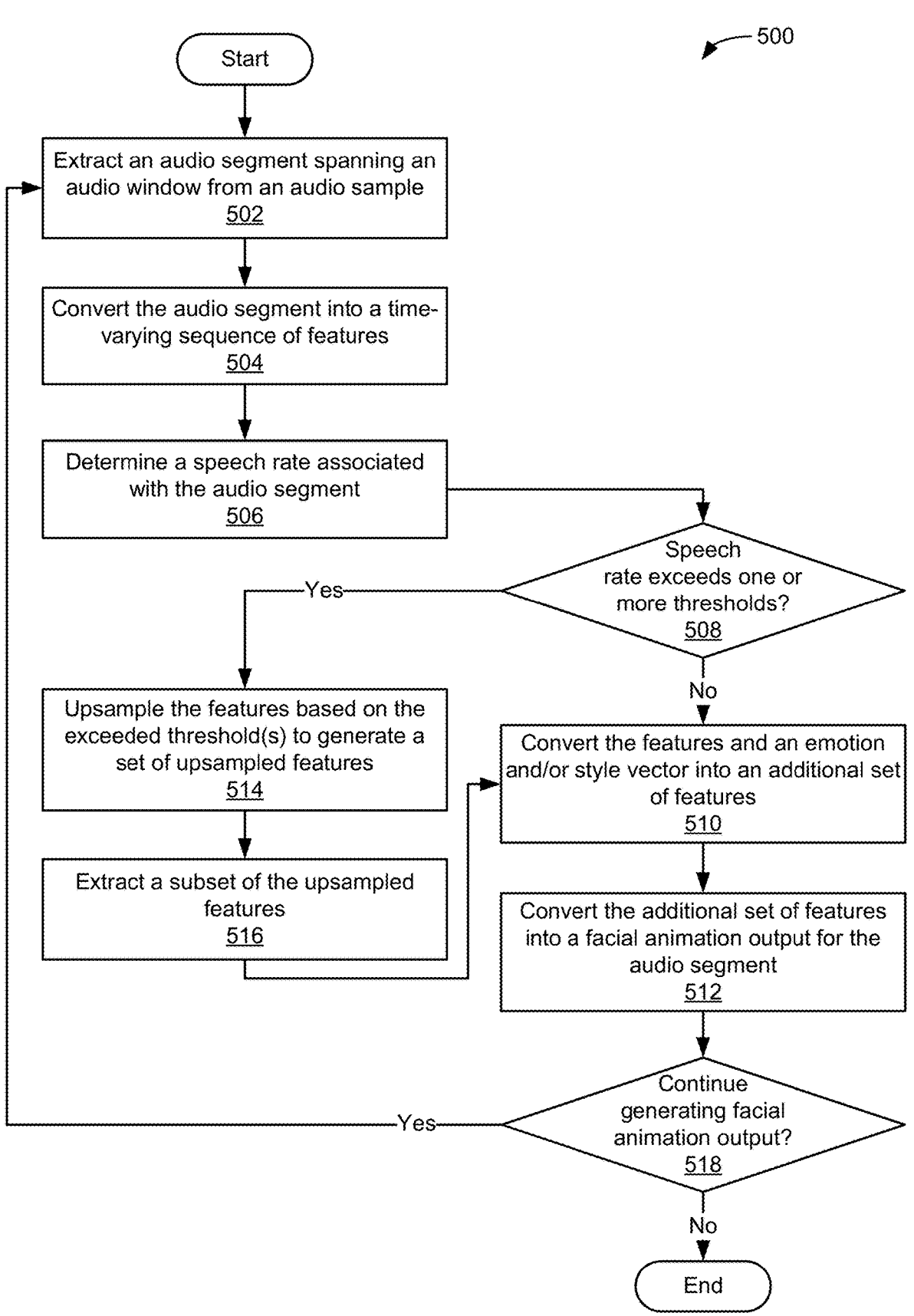
FIG. 5 illustrates a flow diagram of a method for processing an audio input, according to various embodiments.

Now referring to FIG. 5, each block of method 500, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 500 is described, by way of example, with respect to the systems of FIGS. 1-2. However, these methods may additionally or alternatively be executed by any one system, or any combination of systems, including, but not limited to, those described herein. Further, the operations in method 500 can be omitted, repeated, and/or performed in any order without departing from the scope of the present disclosure.

FIG. 5 illustrates a flow diagram of a method 500 for processing an audio input, according to various embodiments. As shown in FIG. 5, method 500 begins with operation 502, in which system 200 extracts an audio segment spanning an audio window from an audio sample. For example, system 200 may extract a 0.5-second audio segment from the audio sample.

In operation 504, analysis network 208 converts the audio segment into a time-varying sequence of features. Continuing with the above example, analysis network 208 may extract raw formant information using fixed-function auto-correlation analysis and subsequently refine the formant information using a number (e.g., 5) of convolutional layers.

In operation 506, detection engine 122 determines a speech rate associated with an audio segment spanning an audio window. For example, detection engine 122 may use a deep neural network, signal processing technique, and/or another technique to detect the speech rate associated with the audio segment as a number of phonemes, a number of transitions between phonemes, and/or another measure of the rate of speech within the audio segment.

In operation 508, detection engine 122 determines whether or not the speech rate exceeds one or more thresholds. For example, detection engine 122 may compute an exponential moving average of the speech rate across a series of audio windows that spans a certain time interval within the audio segment and ends with the audio window used to determine the speech rate in operation 506. Detection engine 122 could also compare the exponential moving average of the speech rate and/or one or more individual measures of speech rate for the corresponding audio window (s) (including the audio window used to determine the speech rate in operation 506) to one or more numeric thresholds that represent various speech rates that are higher than a normal speech rate.

When detection engine 122 determines that the speech rate does not exceed any thresholds, articulation network 210 performs operation 510, in which articulation network 210 converts the features generated in operation 504 along with an emotion and/or style vector into an additional set of features. For example, articulation network 210 may include five convolutional layers that analyze the temporal evolution of the features to generate an abstract feature vector that describes the facial pose at the center of the audio window. As a secondary input, the articulation network may accept a (learned) description of emotional state and/or style to disambiguate between different facial expressions and speaking styles. The emotional state, alone or with style data, can be represented as an E-dimensional vector that is concatenated directly onto the output of each layer in the articulation network, enabling the subsequent layers to alter their behavior accordingly.

In operation 512, output network 212 converts the additional set of features from articulation network 210 into a facial animation output for the audio segment. For example, output network 212 may generate output that includes (but is not limited to) a head displacement, a jaw displacement, an eyeball rotation, a set of skin vertex positions, a set of tongue vertex positions, and/or a set of PCA coefficients associated with a mesh from the additional set of features. This output may additionally be converted into a frame of animation by a renderer.

When detection engine 122 determines that the speech rate exceeds one or more thresholds, processing engine 124 performs operation 514, in which processing engine 124 upsamples the features generated in operation 504 based on the exceeded threshold(s) to generate a set of upsampled features. For example, processing engine 124 may receive the features generated in operation 504, the highest threshold exceeded by the features, and/or an upsampling factor associated with this highest threshold from detection engine 122. Processing engine 124 may also perform bilinear upsampling of the features by the upsampling factor to generate a larger set of upsampled features.

In operation 516, processing engine 124 extracts a subset of the upsampled features. For example, processing engine 124 may extract a certain number of features (e.g., the same number of features as the set of features generated in operation 504) from the temporal center of the upsampled features. Operation 510 is then performed by articulation network 210 using the extracted subset of upsampled features to generate an additional set of features, and operation 512 is performed by output network 212 to convert the additional set of features into a corresponding facial animation output.

After the facial animation output is generated for the audio segment, system 200 performs operation 518, in which system 200 determines whether or not to continue generating facial animation output. For example, system 200 may determine that additional facial animation output is to be generated while additional audio segments remain to be extracted from the audio sample. While system 200 determines that additional facial animation output is to be generated, system 200 repeats operations 502, 504, 506, 508, 510, 512, 514, and/or 516 for each audio segment. For example, system 200 may iteratively perform operation 502 in a way that results in the extraction of a sequence of audio segments of the same length and a certain stride and/or offset from one another within the audio sample. System 200 may also perform operations 504 and 506 for each audio segment to determine an individual speech rate for the audio segment, an aggregated speech rate for a series of audio segments that includes the audio segment, and a set of features for the audio segment. System 200 may then perform operation 508 to determine if the speech rate associated with each audio segment exceeds any thresholds. If no thresholds are exceeded by the speech rate, system 200 may perform operations 510 and 512 using the features generated in operation 504. If one or more thresholds are exceeded by the speech rate, system 200 may perform operations 514 and 516 to convert the features generated in operation 504 into upsampled and cropped features before performing operations 510 and 512 using the upsampled and cropped features. System may thus continue generating facial animation output until the entire audio sample has been processed.

It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. As discussed, aspects of various approaches presented herein can be lightweight enough to execute on a device such as a client device, such as a personal computer or gaming console, in real-time or near real-time. Such processing can be performed on content (e.g., a rendered version of a unique asset) that is generated on, or received by, that client device or received from an external source, such as streaming sensor data or other content received over at least one network. In some instances, the processing and/or determination of this content may be performed by one of these other devices, systems, or entities, then provided to the client device (or another such recipient) for presentation or another such use.

Figure 6:
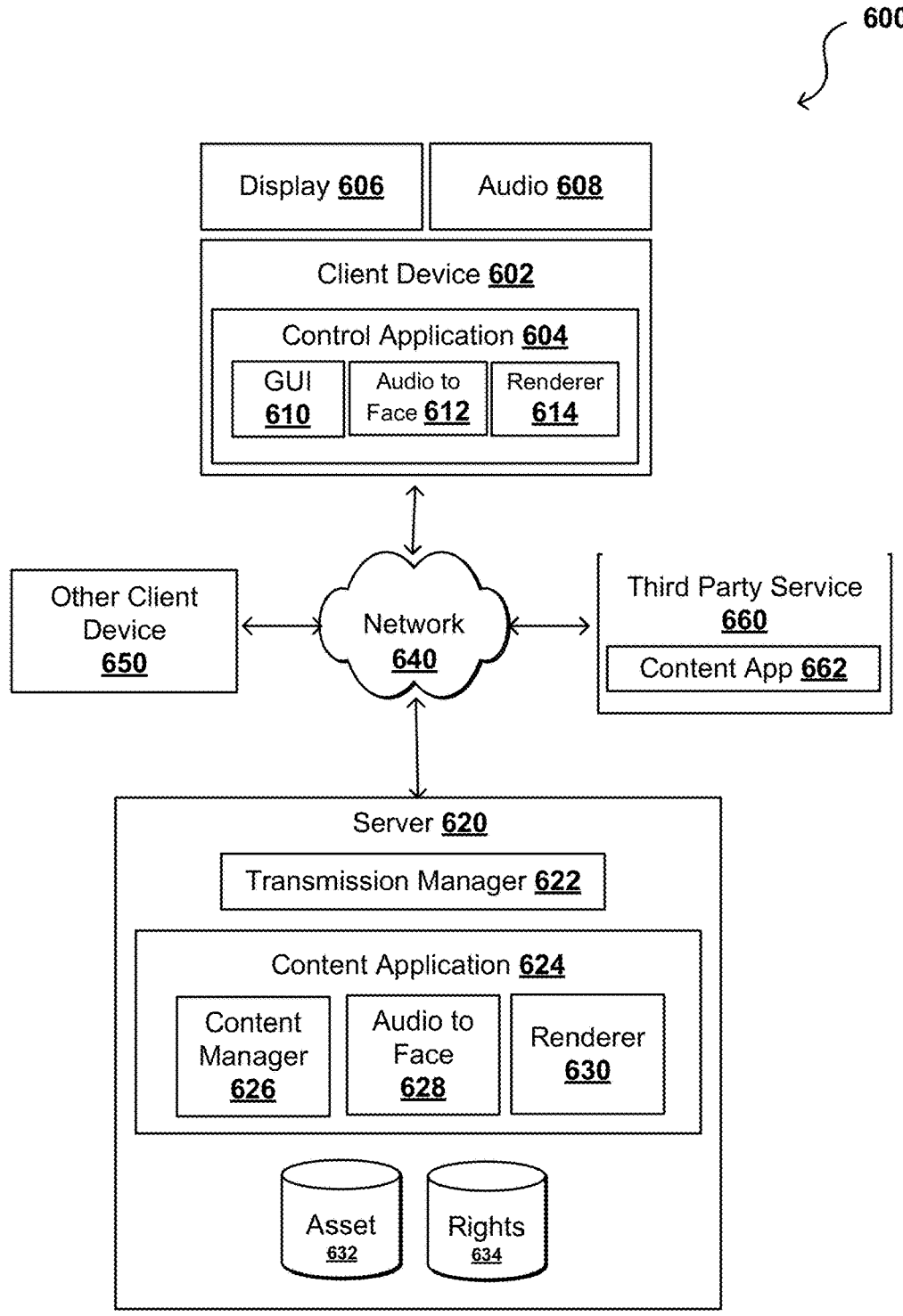
FIG. 6 illustrates components of a distributed system that can be used to generate image or video content, according to various embodiments.

As an example, FIG. 6 illustrates an example network configuration 600 that can be used to provide, generate, modify, encode, and/or transmit data or other such content. In at least one embodiment, a client device 602 can generate or receive data for a session using components of a content application 604 on client device 602 and data stored locally on that client device. In at least one embodiment, a content application 624 executing on a server 620 (e.g., a cloud server or edge server) may initiate a session associated with at least client device 602, as may use a session manager and user data stored in a user database, and can cause content to be determined by a content manager 626. A content manager 626 may work with an audio to emotion module 628 or system to determine motion corresponding to input audio considering emotion or style data, as well as a renderer 630 to generate image, video, or other visual presentation data using an asset (e.g., a character mesh) from an asset database 632, to an extent allowable as determined by a rights manager 634 or other such component or service. At least a portion of that generated content (separate and different from the assets themselves) may be transmitted to client device 602 using an appropriate transmission manager 622 to send by download, streaming, or another such transmission channel. An encoder may be used to encode and/or compress at least some of this data before transmitting to the client device 602. In at least one embodiment, client device 602 receiving such content can provide this content to a corresponding content application 604, which may also or alternatively include a graphical user interface 610, audio to emotion component 612, and renderer 614 for use in generating audio-driven animation or images. A decoder may also be used to decode data received over the network(s) 640 for presentation via client device 602, such as image or video content through a display 606 and audio, such as sounds and music, through at least one audio playback device 608, such as speakers or headphones. In at least one embodiment, at least some of this content may already be stored on, rendered on, or accessible to client device 602 such that transmission over network 640 is not required for at least that portion of content, such as where that content may have been previously downloaded or stored locally on a hard drive or optical disk. In at least one embodiment, a transmission mechanism such as data streaming can be used to transfer this content from server 620 to client device 602. In at least one embodiment, at least a portion of this content can be obtained or streamed from another source, such as a third-party service 660 or other client device 650, that may also include a content application 662 for generating or providing content. In at least one embodiment, portions of this functionality can be performed using multiple computing devices, or multiple processors within one or more computing devices, such as may include a combination of CPUs and GPUs.

In this example, these client devices can include any appropriate computing devices, as may include a desktop computer, notebook computer, set-top box, streaming device, gaming console, smartphone, tablet computer, VR/AR/MR headset, VR/AR/MR goggles, wearable computer, or a smart television. Each client device can submit a request across at least one wired or wireless network, as may include the Internet, an Ethernet, a local area network (LAN), or a cellular network, among other such options. In this example, these requests can be submitted to an address associated with a cloud provider, who may operate or control one or more electronic resources in a cloud provider environment, such as may include a data center or server farm. In at least one embodiment, the request may be received or processed by at least one edge server, that sits on a network edge and is outside at least one security layer associated with the cloud provider environment. In this way, latency can be reduced by enabling the client devices to interact with servers that are in closer proximity, while also improving security of resources in the cloud provider environment.

In at least one embodiment, such a system can be used for performing graphical rendering operations. In other embodiments, such a system can be used for other purposes, such as for providing image or video content to test or validate autonomous machine applications, or for performing deep learning operations. In at least one embodiment, such a system can be implemented using an edge device, or may incorporate one or more Virtual Machines (VMs). In at least one embodiment, such a system can be implemented at least partially in a data center or at least partially using cloud computing resources.

Inference and Training Logic

Figure 7A:
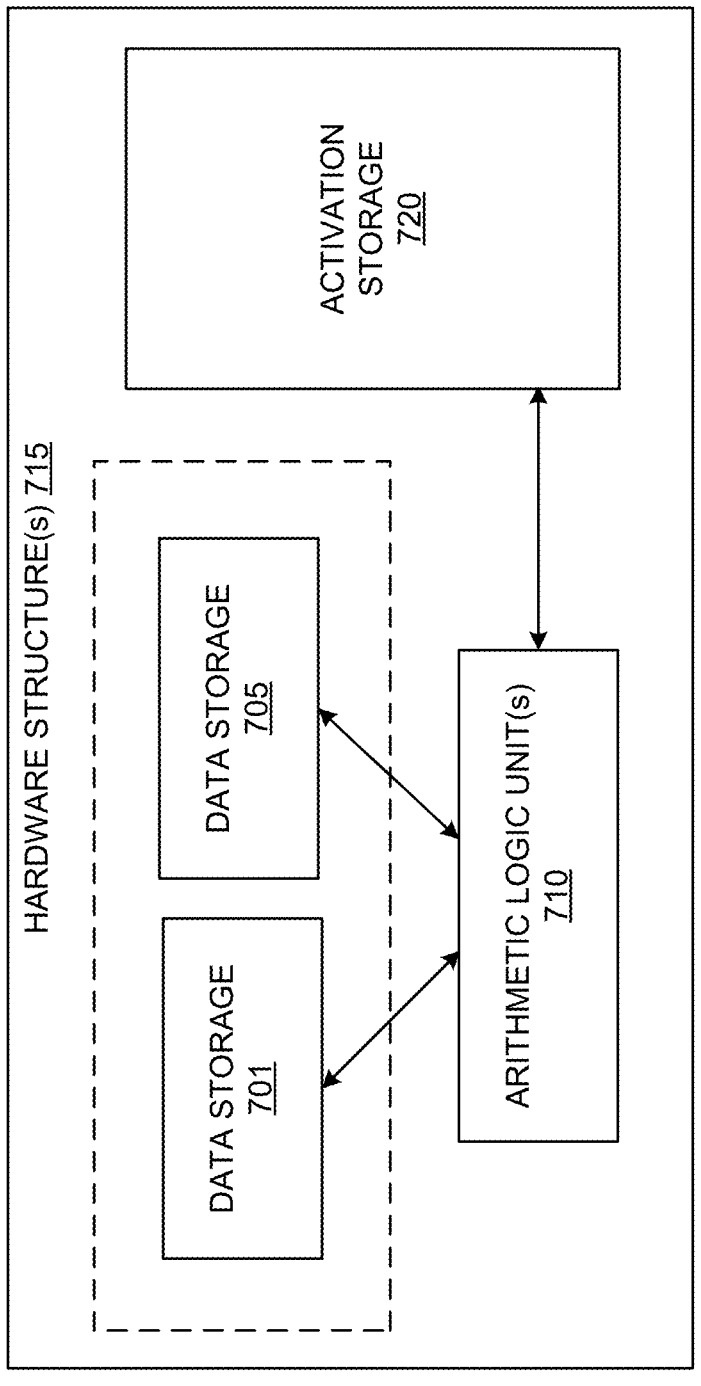
FIG. 7A illustrates inference and/or training logic, according to various embodiments.

FIG. 7A illustrates inference and/or training logic 715 used to perform inferencing and/or training operations associated with one or more embodiments. Details regarding inference and/or training logic 715 are provided below in conjunction with FIGS. 7A and/or 7B.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include, or be coupled to code and/or data storage 701 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or code and/or data storage 701 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 701 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include, or be coupled to code and/or data storage 705 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to on one or more processors or other hardware logic devices or circuits. In at least one embodiment, code and/or data storage 705 may be cache memory, DRAM, SRAM, non-volatile memory (e.g., Flash memory), or other storage. In at least one embodiment, choice of whether code and/or data storage 705 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be same storage structure. In at least one embodiment, code and/or data storage 701 and code and/or data storage 705 may be partially same storage structure and partially separate storage structures. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or code and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALUs 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 701, code and/or data storage 705, and activation storage 720 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., Flash memory), or other storage. In at least one embodiment, activation storage 720 may be completely or partially within or external to one or more processors or other logical circuits. In at least one embodiment, choice of whether activation storage 720 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 715 illustrated in FIG. 7A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7A may be used in conjunction with central processing unit ("CPU") hardware, graphics processing unit ("GPU") hardware or other hardware, such as field programmable gate arrays ("FPGAs").

Figure 7B:
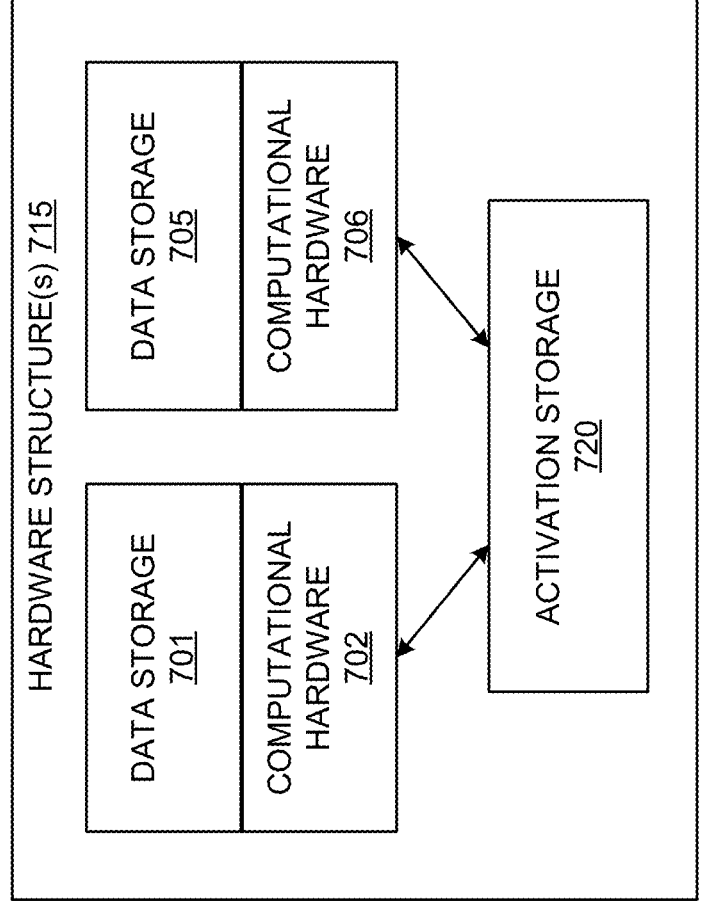
FIG. 7B illustrates inference and/or training logic, according to various embodiments.

FIG. 7B illustrates inference and/or training logic 715, according to at least one or more embodiments. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7B, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 705 and corresponding computational hardware 702 and 706, respectively, correspond to different layers of a neural network, such that resulting activation from one "storage/computational pair 701/702" of code and/or data storage 701 and computational hardware 702 is provided as an input to "storage/computational pair 705/706" of code and/or data storage 705 and computational hardware 706, in order to mirror conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage computation pairs 701/702 and 705/706 may be included in inference and/or training logic 715.

Data Center

FIG. 8 illustrates an example data center 800, in which at least one embodiment may be used. In at least one embodiment, data center 800 includes a data center infrastructure layer 810, a framework layer 820, a software layer 830, and an application layer 840.

In at least one embodiment, as shown in FIG. 8, data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 816(1)-816(N) may be a server having one or more of above-mentioned computing resources.

In at least one embodiment, grouped computing resources 814 may include separate groupings of node C.R.s housed within one or more racks (not shown), or many racks housed in data centers at various geographical locations (also not shown). Separate groupings of node C.R.s within grouped computing resources 814 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 812 may configure or otherwise control one or more node C.R.s 816(1)-816(N) and/or grouped computing resources 814. In at least one embodiment, resource orchestrator 812 may include a software design infrastructure ("SDI") management entity for data center 800. In at least one embodiment, resource orchestrator may include hardware, software or some combination thereof.

In at least one embodiment, as shown in FIG. 8, framework layer 820 includes a job scheduler 822, a configuration manager 824, a resource manager 826 and a distributed file system 828. In at least one embodiment, framework layer 820 may include a framework to support software 832 of software layer 830 and/or one or more application(s) 842 of application layer 840. In at least one embodiment, software 832 or application(s) 842 may respectively include web-based service software or applications, such as those provided by Amazon Web Services, Google Cloud and Microsoft Azure. In at least one embodiment, framework layer 820 may be, but is not limited to, a type of free and open-source software web application framework such as Apache Spark™ (hereinafter "Spark") that may use distributed file system 828 for large-scale data processing (e.g., "big data"). In at least one embodiment, job scheduler 822 may include a Spark driver to facilitate scheduling of workloads supported by various layers of data center 800. In at least one embodiment, configuration manager 824 may be capable of configuring different layers such as software layer 830 and framework layer 820 including Spark and distributed file system 828 for supporting large-scale data processing. In at least one embodiment, resource manager 826 may be capable of managing clustered or grouped computing resources mapped to or allocated for support of distributed file system 828 and job scheduler 822. In at least one embodiment, clustered or grouped computing resources may include grouped computing resource 814 at data center infrastructure layer 810. In at least one embodiment, resource manager 826 may coordinate with resource orchestrator 812 to manage these mapped or allocated computing resources.

In at least one embodiment, software 832 included in software layer 830 may be used by at least portions of node C.R.s 816(1)-816(N), grouped computing resources 814, and/or distributed file system 828 of framework layer 820. The one or more types of software 832 may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816 (N), grouped computing resources 814, and/or distributed file system 828 of framework layer 820. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 824, resource manager 826, and resource orchestrator 812 may implement any number and type of self-modifying actions based on any amount and type of data acquired in any technically feasible fashion. In at least one embodiment, self-modifying actions may relieve a data center operator of data center 800 from making possibly bad configuration decisions and possibly avoiding underused and/or poor performing portions of a data center.

In at least one embodiment, data center 800 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 800. In at least one embodiment, trained machine learning models corresponding to one or more neural networks may be used to infer or predict information using resources described above with respect to data center 800 by using weight parameters calculated through one or more training techniques described herein.

In at least one embodiment, data center 800 may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

In at least one embodiment, inference and/or training logic 715 may be used in system FIG. 8 for inferencing or predicting operations based, at least in part, on weight parameters calculated using neural network training operations, neural network functions and/or architectures, or neural network use cases described herein. Such components can be used generate facial animation from audio data, including accurate depiction of emotional state.

Computer Systems

Figure 9:
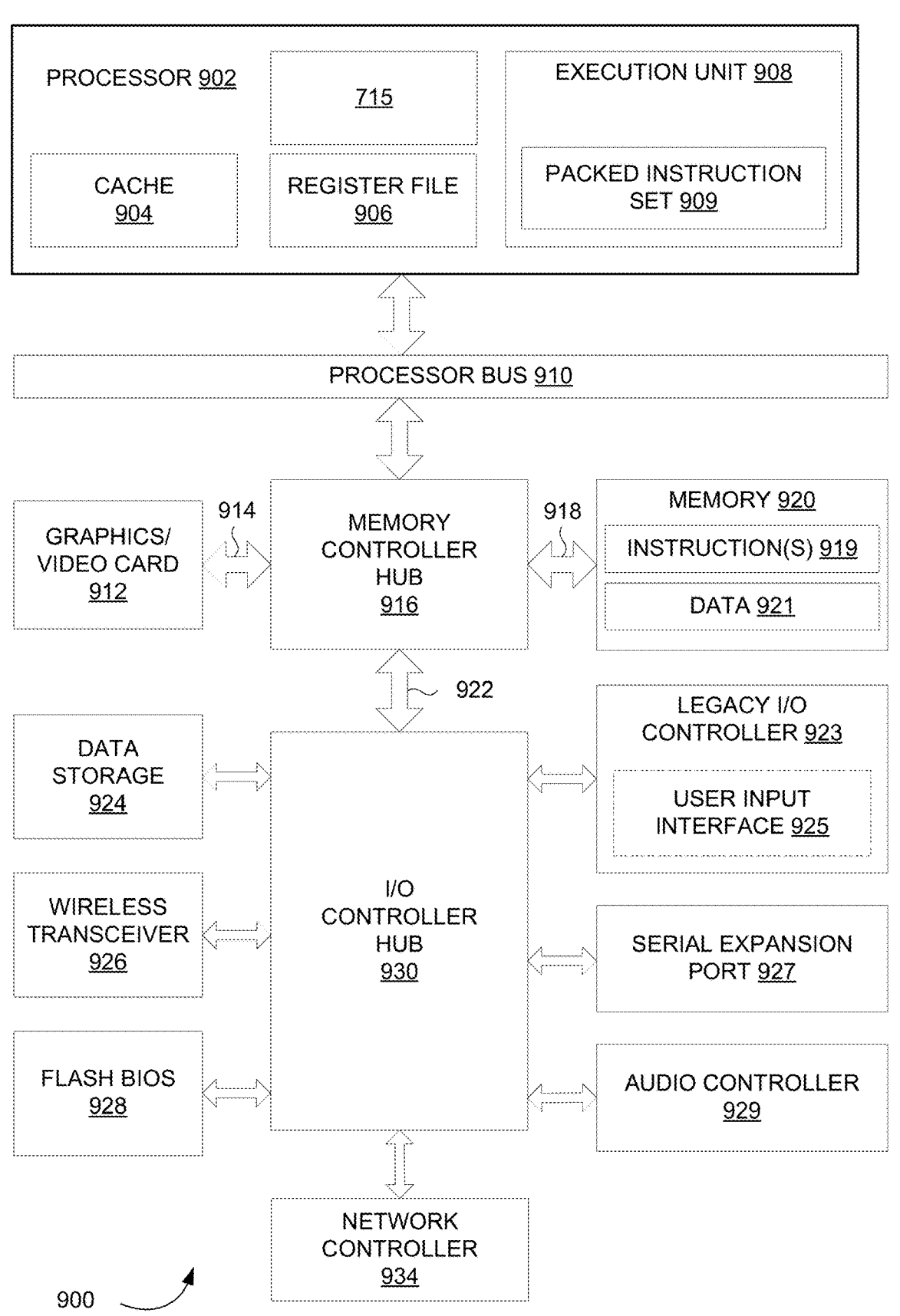
FIG. 9 illustrates a computer system, according to various embodiments.

FIG. 9 is a block diagram illustrating an exemplary computer system, which may be a system with interconnected devices and components, a system-on-a-chip (SOC) or some combination thereof 900 formed with a processor that may include execution units to execute an instruction, according to various embodiments. In at least one embodiment, computer system 900 may include, without limitation, a component, such as a processor 902 to employ execution units including logic to perform algorithms for process data, in accordance with present disclosure, such as in embodiment described herein. In at least one embodiment, computer system 900 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 900 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 900 may include, without limitation, processor 902 that may include, without limitation, one or more execution units 908 to perform machine learning model training and/or inferencing according to techniques described herein. In at least one embodiment, computer system 900 is a single processor desktop or server system, but in another embodiment computer system 900 may be a multiprocessor system. In at least one embodiment, processor 902 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 902 may be coupled to a processor bus 910 that may transmit data signals between processor 902 and other components in computer system 900.

In at least one embodiment, processor 902 may include, without limitation, a Level 1 ("L1") internal cache memory ("cache") 904. In at least one embodiment, processor 902 may have a single internal cache or multiple levels of internal cache. In at least one embodiment, cache memory may reside external to processor 902. Other embodiments may also include a combination of both internal and external caches depending on particular implementation and needs. In at least one embodiment, register file 906 may store different types of data in various registers including, without limitation, integer registers, floating point registers, status registers, and instruction pointer register.

In at least one embodiment, execution unit 908, including, without limitation, logic to perform integer and floating point operations, also resides in processor 902. In at least one embodiment, processor 902 may also include a microcode ("ucode") read only memory ("ROM") that stores microcode for certain macro instructions. In at least one embodiment, execution unit 908 may include logic to handle a packed instruction set 909. In at least one embodiment, by including packed instruction set 909 in an instruction set of a general-purpose processor 902, along with associated circuitry to execute instructions, operations used by many multimedia applications may be performed using packed data in a general-purpose processor 902. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 908 may also be used in microcontrollers, embedded processors, graphics devices, DSPs, and other types of logic circuits. In at least one embodiment, computer system 900 may include, without limitation, a memory 920. In at least one embodiment, memory 920 may be implemented as a Dynamic Random Access Memory ("DRAM") device, a Static Random Access Memory ("SRAM") device, flash memory device, or other memory device. In at least one embodiment, memory 920 may store instruction(s) 919 and/or data 921 represented by data signals that may be executed by processor 902.

In at least one embodiment, system logic chip may be coupled to processor bus 910 and memory 920. In at least one embodiment, system logic chip may include, without limitation, a memory controller hub ("MCH") 916, and processor 902 may communicate with MCH 916 via processor bus 910. In at least one embodiment, MCH 916 may provide a high bandwidth memory path 918 to memory 920 for instruction and data storage and for storage of graphics commands, data and textures. In at least one embodiment, MCH 916 may direct data signals between processor 902, memory 920, and other components in computer system 900 and to bridge data signals between processor bus 910, memory 920, and a system I/O 922. In at least one embodiment, system logic chip may provide a graphics port for coupling to a graphics controller. In at least one embodiment, MCH 916 may be coupled to memory 920 through a high bandwidth memory path 918 and graphics/video card 912 may be coupled to MCH 916 through an Accelerated Graphics Port ("AGP") interconnect 914.

In at least one embodiment, computer system 900 may use system I/O 922 that is a proprietary hub interface bus to couple MCH 916 to I/O controller hub ("ICH") 930. In at least one embodiment, ICH 930 may provide direct connections to some I/O devices via a local I/O bus. In at least one embodiment, local I/O bus may include, without limitation, a high-speed I/O bus for connecting peripherals to memory 920, chipset, and processor 902. Examples may include, without limitation, an audio controller 929, a firmware hub ("flash BIOS") 928, a wireless transceiver 926, a data storage 924, a legacy I/O controller 923 containing user input and keyboard interfaces 925, a serial expansion port 927, such as Universal Serial Bus ("USB"), and a network controller 934. Data storage 924 may comprise a hard disk drive, a floppy disk drive, a CD-ROM device, a flash memory device, or other mass storage device.

In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 900 are interconnected using compute express link (CXL) interconnects.

In at least one embodiment, inference and/or training logic 715 may be used in system FIG. 9 for inferencing or predicting operations based, at least in part, on weight parameters calculated using neural network training operations, neural network functions and/or architectures, or neural network use cases described herein. Such components can be used generate facial animation from audio data, including accurate depiction of emotional state.

Figure 10:
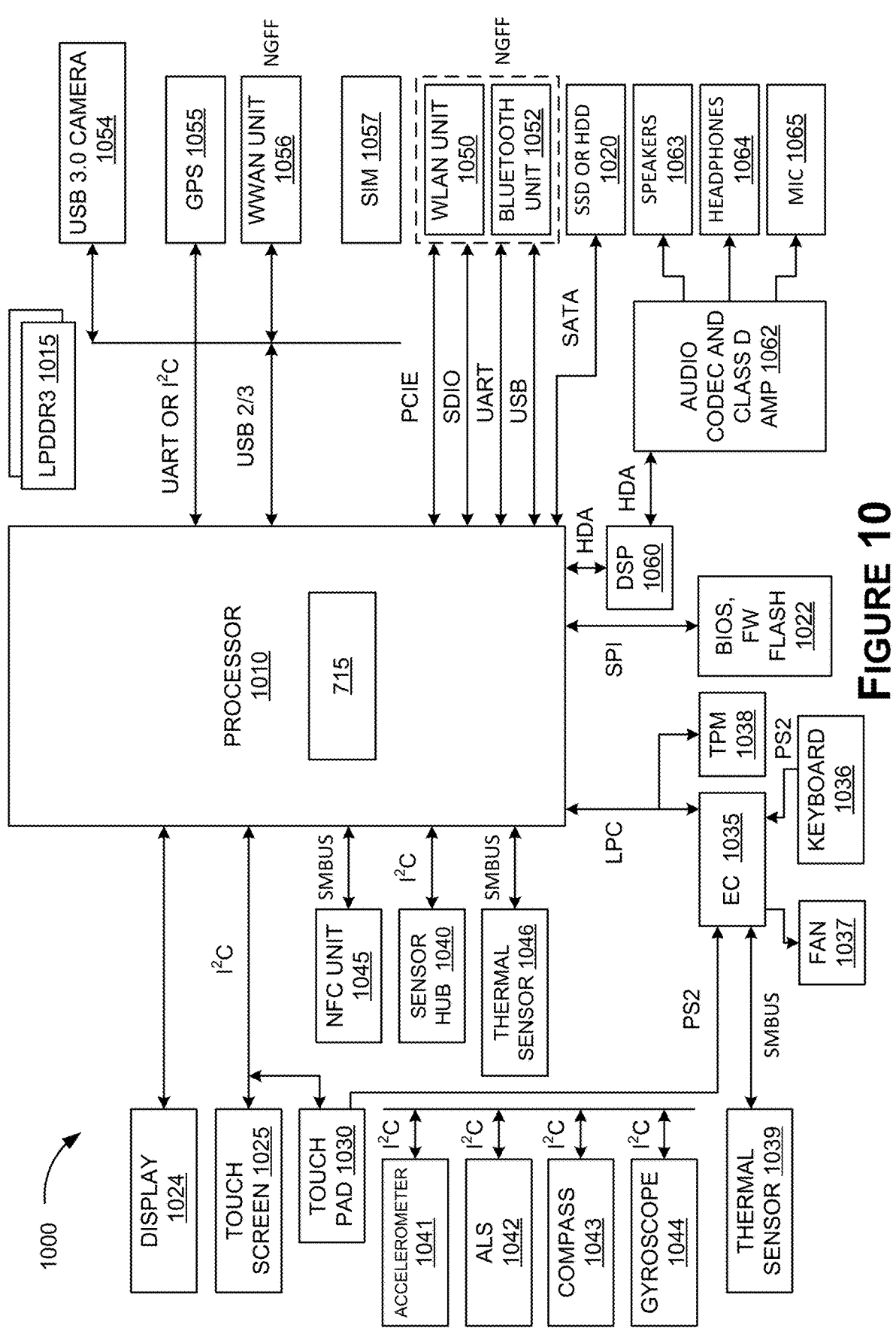
FIG. 10 illustrates a computer system, according to various embodiments.

FIG. 10 is a block diagram illustrating an electronic device 1000 for utilizing a processor 1010, according to various embodiments. In at least one embodiment, electronic device 1000 may be, for example and without limitation, a notebook, a tower server, a rack server, a blade server, a laptop, a desktop, a tablet, a mobile device, a phone, an embedded computer, or any other suitable electronic device.

In at least one embodiment, electronic device 1000 may include, without limitation, processor 1010 communicatively coupled to any suitable number or kind of components, peripherals, modules, or devices. In at least one embodiment, processor 1010 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 10 illustrates a system, which includes interconnected hardware devices or "chips", whereas in other embodiments, FIG. 10 may illustrate an exemplary System on a Chip ("SoC"). In at least one embodiment, devices illustrated in FIG. 10 may be interconnected with proprietary interconnects, standardized interconnects (e.g., PCIe) or some combination thereof. In at least one embodiment, one or more components of FIG. 10 are interconnected using compute express link (CXL) interconnects.

In at least one embodiment, FIG. 10 may include a display 1024, a touch screen 1025, a touch pad 1030, a Near Field Communications unit ("NFC") 1045, a sensor hub 1040, a thermal sensor 1046, an Express Chipset ("EC") 1035, a Trusted Platform Module ("TPM") 1038, BIOS/firmware/flash memory ("BIOS, FW Flash") 1022, a DSP 1060, a drive 1020 such as a Solid State Disk ("SSD") or a Hard Disk Drive ("HDD"), a wireless local area network unit ("WLAN") 1050, a Bluetooth unit 1052, a Wireless Wide Area Network unit ("WWAN") 1056, a Global Positioning System (GPS) 1055, a camera ("USB 3.0 camera") 1054 such as a USB 3.0 camera, and/or a Low Power Double Data Rate ("LPDDR") memory unit ("LPDDR3") 1015 implemented in, for example, LPDDR3 standard. These components may each be implemented in any suitable manner.

In at least one embodiment, other components may be communicatively coupled to processor 1010 through components discussed above. In at least one embodiment, an accelerometer 1041, Ambient Light Sensor ("ALS") 1042, compass 1043, and a gyroscope 1044 may be communicatively coupled to sensor hub 1040. In at least one embodiment, thermal sensor 1039, a fan 1037, a keyboard 1036, and a touch pad 1030 may be communicatively coupled to EC 1035. In at least one embodiment, speaker 1063, headphones 1064, and microphone ("mic") 1065 may be communicatively coupled to an audio unit ("audio codec and class d amp") 1062, which may in turn be communicatively coupled to DSP 1060. In at least one embodiment, audio unit 1062 may include, for example and without limitation, an audio coder/decoder ("codec") and a class D amplifier. In at least one embodiment, SIM card ("SIM") 1057 may be communicatively coupled to WWAN unit 1056. In at least one embodiment, components such as WLAN unit 1050 and Bluetooth unit 1052, as well as WWAN unit 1056 may be implemented in a Next Generation Form Factor ("NGFF").

In at least one embodiment, inference and/or training logic 715 may be used in system FIG. 10 for inferencing or predicting operations based, at least in part, on weight parameters calculated using neural network training operations, neural network functions and/or architectures, or neural network use cases described herein. Such components can be used generate facial animation from audio data, including accurate depiction of emotional state.

Figure 11:
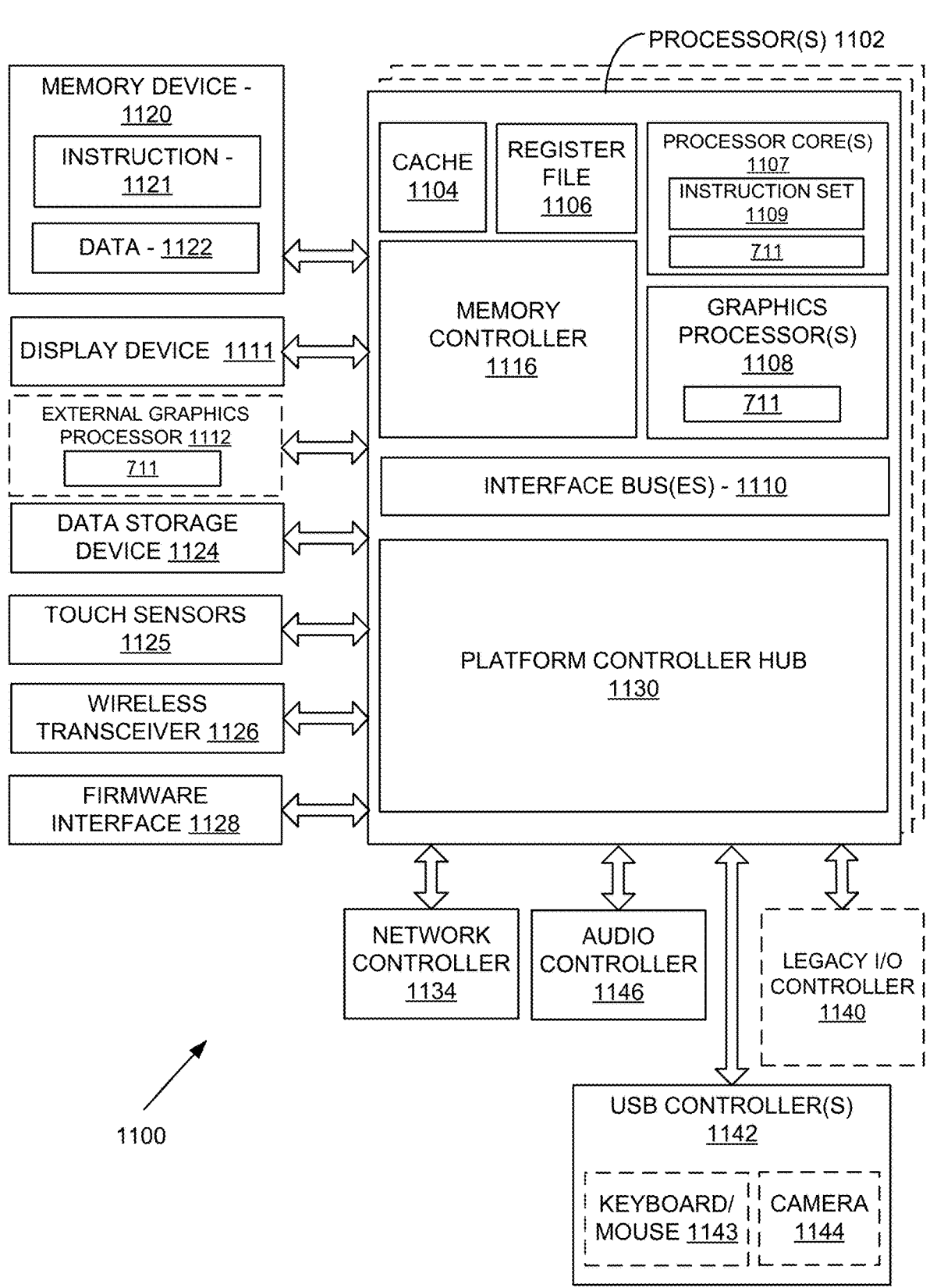
FIG. 11 illustrates at least portions of a graphics processor, according to one or more embodiments.

FIG. 11 is a block diagram of a processing system, according to various embodiments. In at least one embodiment, system 1100 includes one or more processors 1102 and one or more graphics processors 1108, and may be a single processor desktop system, a multiprocessor workstation system, or a server system having a large number of processors 1102 or processor cores 1107. In at least one embodiment, system 1100 is a processing platform incorporated within a system-on-a-chip (SoC) integrated circuit for use in mobile, handheld, or embedded devices.

In at least one embodiment, system 1100 can include, or be incorporated within a server-based gaming platform, a game console, including a game and media console, a mobile gaming console, a handheld game console, or an online game console. In at least one embodiment, system 1100 is a mobile phone, smart phone, tablet computing device or mobile Internet device. In at least one embodiment, processing system 1100 can also include, couple with, or be integrated within a wearable device, such as a smart watch wearable device, smart eyewear device, augmented reality device, or virtual reality device. In at least one embodiment, processing system 1100 is a television or set top box device having one or more processors 1102 and a graphical interface generated by one or more graphics processors 1108.

In at least one embodiment, one or more processors 1102 each include one or more processor cores 1107 to process instructions which, when executed, perform operations for system and user software. In at least one embodiment, each of one or more processor cores 1107 is configured to process a specific instruction set 1109. In at least one embodiment, instruction set 1109 may facilitate Complex Instruction Set Computing (CISC), Reduced Instruction Set Computing (RISC), or computing via a Very Long Instruction Word (VLIW). In at least one embodiment, processor cores 1107 may each process a different instruction set 1109, which may include instructions to facilitate emulation of other instruction sets. In at least one embodiment, processor core 1107 may also include other processing devices, such a Digital Signal Processor (DSP).

In at least one embodiment, processor 1102 includes cache memory 1104. In at least one embodiment, processor 1102 can have a single internal cache or multiple levels of internal cache. In at least one embodiment, cache memory is shared among various components of processor 1102. In at least one embodiment, processor 1102 also uses an external cache (e.g., a Level-3 (L3) cache or Last Level Cache (LLC)) (not shown), which may be shared among processor cores 1107 using known cache coherency techniques. In at least one embodiment, register file 1106 is additionally included in processor 1102 which may include different types of registers for storing different types of data (e.g., integer registers, floating point registers, status registers, and an instruction pointer register). In at least one embodiment, register file 1106 may include general-purpose registers or other registers.

In at least one embodiment, one or more processor(s) 1102 are coupled with one or more interface bus(es) 1110 to transmit communication signals such as address, data, or control signals between processor 1102 and other components in system 1100. In at least one embodiment, interface bus 1110, in one embodiment, can be a processor bus, such as a version of a Direct Media Interface (DMI) bus. In at least one embodiment, interface bus 1110 is not limited to a DMI bus, and may include one or more Peripheral Component Interconnect buses (e.g., PCI, PCI Express), memory busses, or other types of interface busses. In at least one embodiment processor(s) 1102 include an integrated memory controller 1116 and a platform controller hub 1130. In at least one embodiment, memory controller 1116 facilitates communication between a memory device and other components of system 1100, while platform controller hub (PCH) 1130 provides connections to I/O devices via a local I/O bus.

In at least one embodiment, memory device 1120 can be a dynamic random access memory (DRAM) device, a static random access memory (SRAM) device, flash memory device, phase-change memory device, or some other memory device having suitable performance to serve as process memory. In at least one embodiment memory device 1120 can operate as system memory for system 1100, to store data 1122 and instructions 1121 for use when one or more processors 1102 executes an application or process. In at least one embodiment, memory controller 1116 also couples with an optional external graphics processor 1112, which may communicate with one or more graphics processors 1108 in processors 1102 to perform graphics and media operations. In at least one embodiment, a display device 1111 can connect to processor(s) 1102. In at least one embodiment display device 1111 can include one or more of an internal display device, as in a mobile electronic device or a laptop device or an external display device attached via a display interface (e.g., DisplayPort, etc.). In at least one embodiment, display device 1111 can include a head mounted display (HMD) such as a stereoscopic display device for use in virtual reality (VR) applications or augmented reality (AR) applications.

In at least one embodiment, platform controller hub 1130 enables peripherals to connect to memory device 1120 and processor 1102 via a high-speed I/O bus. In at least one embodiment, I/O peripherals include, but are not limited to, an audio controller 1146, a network controller 1134, a firmware interface 1128, a wireless transceiver 1126, touch sensors 1125, a data storage device 1124 (e.g., hard disk drive, flash memory, etc.). In at least one embodiment, data storage device 1124 can connect via a storage interface (e.g., SATA) or via a peripheral bus, such as a Peripheral Component Interconnect bus (e.g., PCI, PCI Express). In at least one embodiment, touch sensors 1125 can include touch screen sensors, pressure sensors, or fingerprint sensors. In at least one embodiment, wireless transceiver 1126 can be a Wi-Fi transceiver, a Bluetooth transceiver, or a mobile network transceiver such as a 3G, 4G, or Long Term Evolution (LTE) transceiver. In at least one embodiment, firmware interface 1128 enables communication with system firmware, and can be, for example, a unified extensible firmware interface (UEFI). In at least one embodiment, network controller 1134 can enable a network connection to a wired network. In at least one embodiment, a high-performance network controller (not shown) couples with interface bus 1110. In at least one embodiment, audio controller 1146 is a multi-channel high definition audio controller. In at least one embodiment, system 1100 includes an optional legacy I/O controller 1140 for coupling legacy (e.g., Personal System 2 (PS/2)) devices to system. In at least one embodiment, platform controller hub 1130 can also connect to one or more Universal Serial Bus (USB) controllers 1142 connect input devices, such as keyboard and mouse 1143 combinations, a camera 1144, or other USB input devices.

In at least one embodiment, an instance of memory controller 1116 and platform controller hub 1130 may be integrated into a discreet external graphics processor, such as external graphics processor 1112. In at least one embodiment, platform controller hub 1130 and/or memory controller 1116 may be external to one or more processor(s) 1102. For example, in at least one embodiment, system 1100 can include an external memory controller 1116 and platform controller hub 1130, which may be configured as a memory controller hub and peripheral controller hub within a system chipset that is in communication with processor(s) 1102.

In at least one embodiment portions or all of inference and/or training logic 715 may be incorporated into graphics processor 1500. For example, in at least one embodiment, training and/or inferencing techniques described herein may use one or more of ALUs embodied in a graphics processor. Moreover, in at least one embodiment, inferencing and/or training operations described herein may be done using logic other than logic illustrated in FIG. 7A or 7B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein. Such components can be used generate facial animation from audio data, including accurate depiction of emotional state.

Figure 12:
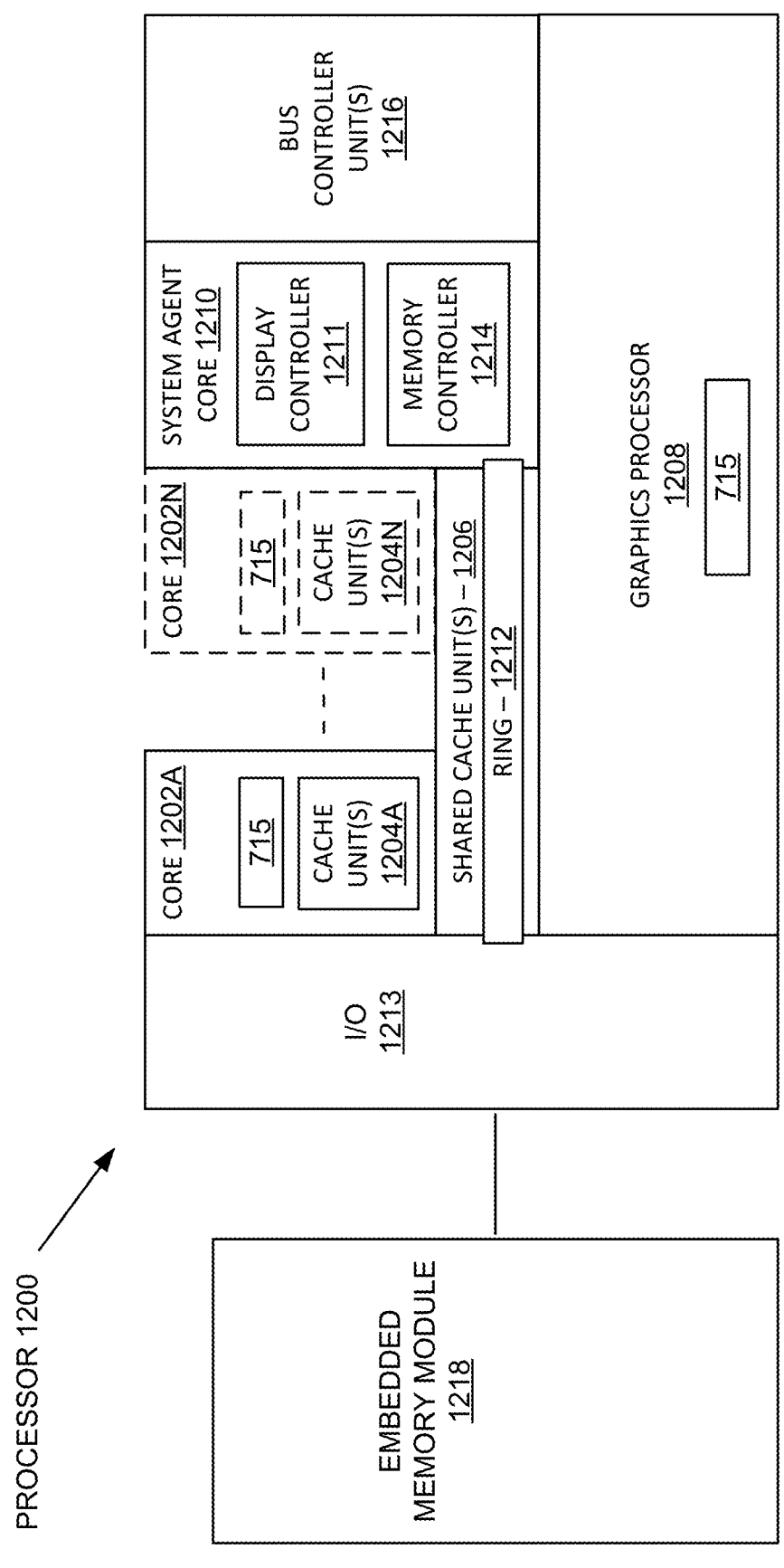
FIG. 12 illustrates at least portions of a graphics processor, according to one or more embodiments.

FIG. 12 is a block diagram of a processor 1200 having one or more processor cores 1202A-1202N, an integrated memory controller 1214, and an integrated graphics processor 1208, according to various embodiments. In at least one embodiment, processor 1200 can include additional cores up to and including additional core 1202N represented by dashed lined boxes. In at least one embodiment, each of processor cores 1202A-1202N includes one or more internal cache units 1204A-1204N. In at least one embodiment, each processor core also has access to one or more shared cached units 1206.

In at least one embodiment, internal cache units 1204A-1204N and shared cache units 1206 represent a cache memory hierarchy within processor 1200. In at least one embodiment, cache memory units 1204A-1204N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1206 and 1204A-1204N.

In at least one embodiment, processor 1200 may also include a set of one or more bus controller units 1216 and a system agent core 1210. In at least one embodiment, one or more bus controller units 1216 manage a set of peripheral buses, such as one or more PCI or PCI express busses. In at least one embodiment, system agent core 1210 provides management functionality for various processor components. In at least one embodiment, system agent core 1210 includes one or more integrated memory controllers 1214 to manage access to various external memory devices (not shown).

In at least one embodiment, one or more of processor cores 1202A-1202N include support for simultaneous multi-threading. In at least one embodiment, system agent core 1210 includes components for coordinating and operating cores 1202A-1202N during multi-threaded processing. In at least one embodiment, system agent core 1210 may additionally include a power control unit (PCU), which includes logic and components to regulate one or more power states of processor cores 1202A-1202N and graphics processor 1208.

In at least one embodiment, processor 1200 additionally includes graphics processor 1208 to execute graphics processing operations. In at least one embodiment, graphics processor 1208 couples with shared cache units 1206, and system agent core 1210, including one or more integrated memory controllers 1214. In at least one embodiment, system agent core 1210 also includes a display controller 1211 to drive graphics processor output to one or more coupled displays. In at least one embodiment, display controller 1211 may also be a separate module coupled with graphics processor 1208 via at least one interconnect, or may be integrated within graphics processor 1208.

In at least one embodiment, a ring based interconnect unit 1212 is used to couple internal components of processor 1200. In at least one embodiment, an alternative interconnect unit may be used, such as a point-to-point interconnect, a switched interconnect, or other techniques. In at least one embodiment, graphics processor 1208 couples with ring interconnect unit 1212 via an I/O link 1213.

In at least one embodiment, I/O link 1213 represents at least one of multiple varieties of I/O interconnects, including an on package I/O interconnect which facilitates communication between various processor components and a high-performance embedded memory module 1218, such as an eDRAM module. In at least one embodiment, each of processor cores 1202A-1202N and graphics processor 1208 use embedded memory modules 1218 as a shared Last Level Cache.

In at least one embodiment, processor cores 1202A-1202N are homogenous cores executing a common instruction set architecture. In at least one embodiment, processor cores 1202A-1202N are heterogeneous in terms of instruction set architecture (ISA), where one or more of processor cores 1202A-1202N execute a common instruction set, while one or more other cores of processor cores 1202A-1202N executes a subset of a common instruction set or a different instruction set. In at least one embodiment, processor cores 1202A-1202N are heterogeneous in terms of microarchitecture, where one or more cores having a relatively higher power consumption couple with one or more power cores having a lower power consumption. In at least one embodiment, processor 1200 can be implemented on one or more chips or as an SoC integrated circuit.

In at least one embodiment portions or all of inference and/or training logic 715 may be incorporated into processor 1200. For example, in at least one embodiment, training and/or inferencing techniques described herein may use one or more of ALUs embodied in graphics processor 1208, graphics core(s) 1202A-1202N, or other components in FIG. 12. Moreover, in at least one embodiment, inferencing and/or training operations described herein may be done using logic other than logic illustrated in FIG. 7A or 7B. In at least one embodiment, weight parameters may be stored in on-chip or off-chip memory and/or registers (shown or not shown) that configure ALUs of graphics processor 1200 to perform one or more machine learning algorithms, neural network architectures, use cases, or training techniques described herein. Such components can be used generate facial animation from audio data, including accurate depiction of emotional state.

Virtualized Computing Platform

Figure 13:
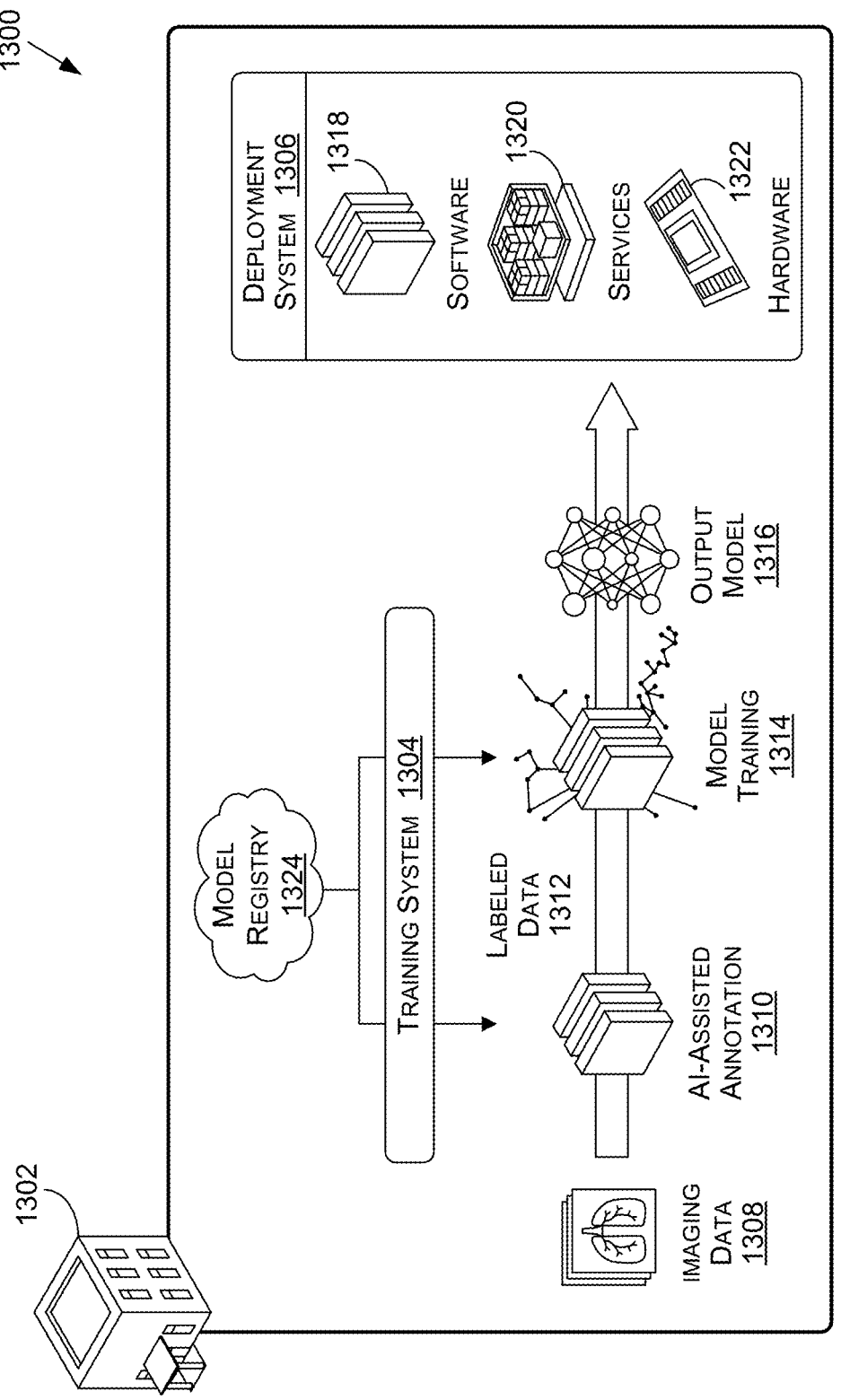
FIG. 13 is an example data flow diagram for an advanced computing pipeline, in accordance with at least one embodiment.

FIG. 13 is an example data flow diagram for a process 1300 of generating and deploying an image processing and inferencing pipeline, in accordance with at least one embodiment. In at least one embodiment, process 1300 may be deployed for use with imaging devices, processing devices, and/or other device types at one or more facilities 1302. Process 1300 may be executed within a training system 1304 and/or a deployment system 1306. In at least one embodiment, training system 1304 may be used to perform training, deployment, and implementation of machine learning models (e.g., neural networks, object detection algorithms, computer vision algorithms, etc.) for use in deployment system 1306. In at least one embodiment, deployment system 1306 may be configured to offload processing and compute resources among a distributed computing environment to reduce infrastructure requirements at facility 1302. In at least one embodiment, one or more applications in a pipeline may use or call upon services (e.g., inference, visualization, compute, AI, etc.) of deployment system 1306 during execution of applications.

In at least one embodiment, some of applications used in advanced processing and inferencing pipelines may use machine learning models or other AI to perform one or more processing steps. In at least one embodiment, machine learning models may be trained at facility 1302 using data 1308 (such as imaging data) generated at facility 1302 (and stored on one or more picture archiving and communication system (PACS) servers at facility 1302), may be trained using imaging or sequencing data 1308 from another facility (ies), or a combination thereof. In at least one embodiment, training system 1304 may be used to provide applications, services, and/or other resources for generating working, deployable machine learning models for deployment system 1306.

In at least one embodiment, model registry 1324 may be backed by object storage that may support versioning and object metadata. In at least one embodiment, object storage may be accessible through, for example, a cloud storage (e.g., cloud 1426 of FIG. 14) compatible application programming interface (API) from within a cloud platform. In at least one embodiment, machine learning models within model registry 1324 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training pipeline 1404 (FIG. 14) may include a scenario where facility 1302 is training their own machine learning model, or has an existing machine learning model that needs to be optimized or updated. In at least one embodiment, imaging data 1308 generated by imaging device(s), sequencing devices, and/or other device types may be received. In at least one embodiment, once imaging data 1308 is received, AI-assisted annotation 1310 may be used to aid in generating annotations corresponding to imaging data 1308 to be used as ground truth data for a machine learning model. In at least one embodiment, AI-assisted annotation 1310 may include one or more machine learning models (e.g., convolutional neural networks (CNNs)) that may be trained to generate annotations corresponding to certain types of imaging data 1308 (e.g., from certain devices). In at least one embodiment, AI-assisted annotations 1310 may then be used directly, or may be adjusted or fine-tuned using an annotation tool to generate ground truth data. In at least one embodiment, AI-assisted annotations 1310, labeled clinic data 1312, or a combination thereof may be used as ground truth data for training a machine learning model. In at least one embodiment, a trained machine learning model may be referred to as output model 1316, and may be used by deployment system 1306, as described herein.

In at least one embodiment, training pipeline 1404 (FIG. 14) may include a scenario where facility 1302 needs a machine learning model for use in performing one or more processing tasks for one or more applications in deployment system 1306, but facility 1302 may not currently have such a machine learning model (or may not have a model that is optimized, efficient, or effective for such purposes). In at least one embodiment, an existing machine learning model may be selected from a model registry 1324. In at least one embodiment, model registry 1324 may include machine learning models trained to perform a variety of different inference tasks on imaging data. In at least one embodiment, machine learning models in model registry 1324 may have been trained on imaging data from different facilities than facility 1302 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1324. In at least one embodiment, a machine learning model may then be retrained, or updated, at any number of other facilities, and a retrained or updated model may be made available in model registry 1324. In at least one embodiment, a machine learning model may then be selected from model registry 1324—and referred to as output model 1316—and may be used in deployment system 1306 to perform one or more processing tasks for one or more applications of a deployment system.

In at least one embodiment, training pipeline 1404 (FIG. 14) may include a scenario where facility 1302 requires a machine learning model for use in performing one or more processing tasks for one or more applications in deployment system 1306, but facility 1302 may not currently have such a machine learning model (or may not have a model that is optimized, efficient, or effective for such purposes). In at least one embodiment, a machine learning model selected from model registry 1324 may not be fine-tuned or optimized for imaging data 1308 generated at facility 1302 because of differences in populations, robustness of training data used to train a machine learning model, diversity in anomalies of training data, and/or other issues with training data. In at least one embodiment, AI-assisted annotation 1310 may be used to aid in generating annotations corresponding to imaging data 1308 to be used as ground truth data for retraining or updating a machine learning model. In at least one embodiment, labeled data 1312 may be used as ground truth data for training a machine learning model. In at least one embodiment, retraining or updating a machine learning model may be referred to as model training 1314. In at least one embodiment, model training 1314—e.g., AI-assisted annotations 1310, labeled clinic data 1312, or a combination thereof—may be used as ground truth data for retraining or updating a machine learning model. In at least one embodiment, a trained machine learning model may be referred to as output model 1316, and may be used by deployment system 1306, as described herein.

In at least one embodiment, deployment system 1306 may include software 1318, services 1320, hardware 1322, and/or other components, features, and functionality. In at least one embodiment, deployment system 1306 may include a software "stack," such that software 1318 may be built on top of services 1320 and may use services 1320 to perform some or all of processing tasks, and services 1320 and software 1318 may be built on top of hardware 1322 and use hardware 1322 to execute processing, storage, and/or other compute tasks of deployment system 1306. In at least one embodiment, software 1318 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, an advanced processing and inferencing pipeline may be defined based on selections of different containers that are desired or required for processing imaging data 1308, in addition to containers that receive and configure imaging data for use by each container and/or for use by facility 1302 after processing through a pipeline (e.g., to convert outputs back to a usable data type). In at least one embodiment, a combination of containers within software 1318 (e.g., that make up a pipeline) may be referred to as a virtual instrument (as described in more detail herein), and a virtual instrument may leverage services 1320 and hardware 1322 to execute some or all processing tasks of applications instantiated in containers.

In at least one embodiment, a data processing pipeline may receive input data (e.g., imaging data 1308) in a specific format in response to an inference request (e.g., a request from a user of deployment system 1306). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 1316 of training system 1304.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 1324 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 1320 as a system (e.g., system 1400 of FIG. 14). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming data. In at least one embodiment, once validated by system 1400 (e.g., for accuracy), an application may be available in a container registry for selection and/or implementation by a user to perform one or more processing tasks with respect to data at a facility (e.g., a second facility) of a user.

Figure 14:
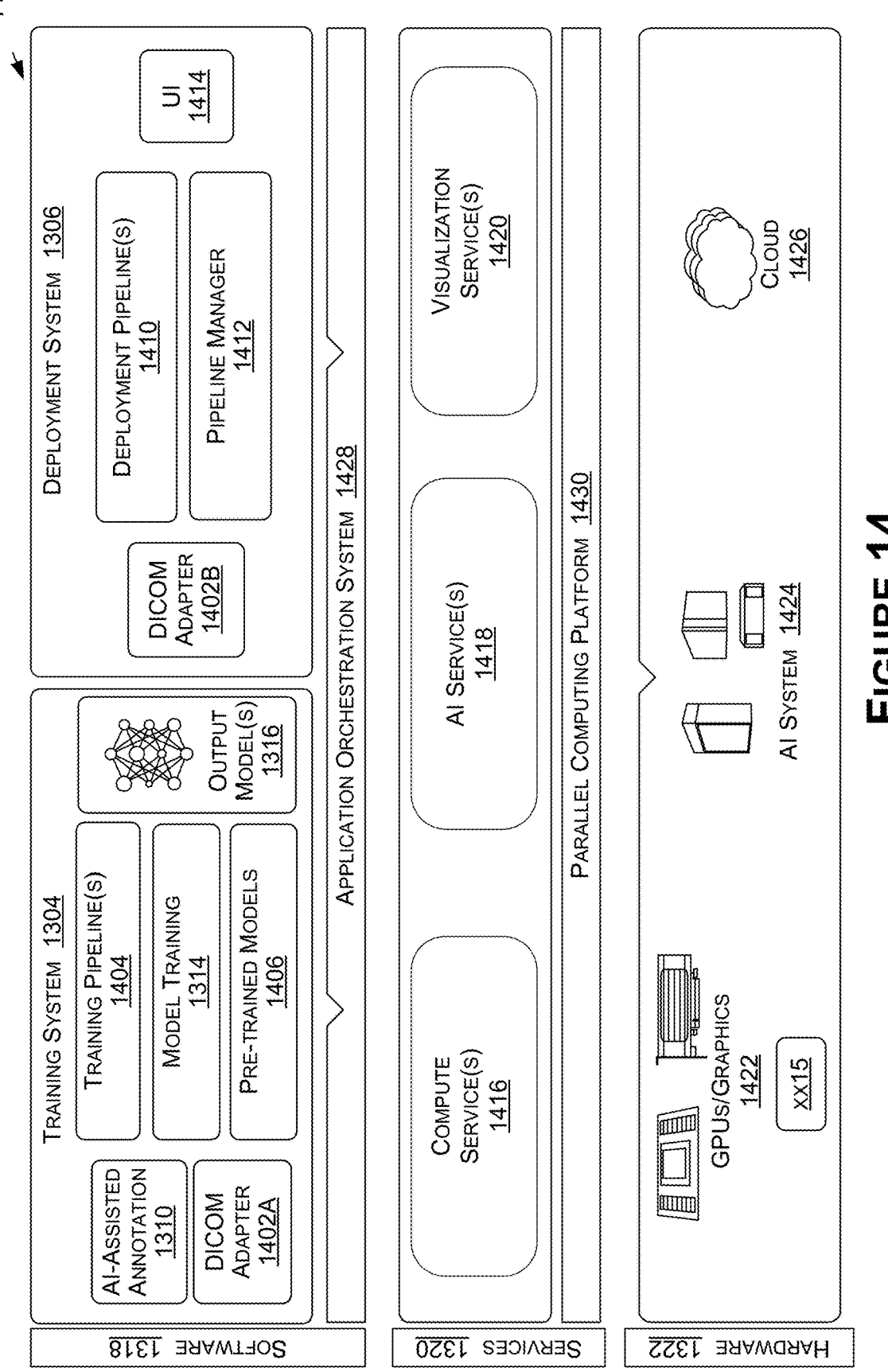
FIG. 14 is a system diagram for an example system for training, adapting, instantiating and deploying machine learning models in an advanced computing pipeline, in accordance with at least one embodiment.

In at least one embodiment, developers may then share applications or containers through a network for access and use by users of a system (e.g., system 1400 of FIG. 14). In at least one embodiment, completed and validated applications or containers may be stored in a container registry and associated machine learning models may be stored in model registry 1324. In at least one embodiment, a requesting entity-who provides an inference or image processing request—may browse a container registry and/or model registry 1324 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1306 (e.g., a cloud) to perform processing of data processing pipeline. In at least one embodiment, processing by deployment system 1306 may include referencing selected elements (e.g., applications, containers, models, etc.) from a container registry and/or model registry 1324. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 1320 may be leveraged. Services 1320 may include compute services, artificial intelligence (AI) services, visualization services, and/or other service types. Services 1320 may provide functionality that is common to one or more applications in software 1318, so functionality may be abstracted to a service that may be called upon or leveraged by applications. Functionality provided by services 1320 may run dynamically and more efficiently, while also scaling well by allowing applications to process data in parallel (e.g., using a parallel computing platform 1430 (FIG. 14)). In at least one embodiment, rather than each application that shares a same functionality offered by a service 1320 being required to have a respective instance of service 1320, service 1320 may be shared between and among various applications. In at least one embodiment, services 1320 may include (without limitation) an inference server or engine that may be used for executing detection or segmentation tasks, a model training service that provides machine learning model training and/or retraining capabilities, a data augmentation service that provides GPU accelerated data (e.g., DICOM, RIS, CIS, REST compliant, RPC, raw, etc.) extraction, resizing, scaling, and/or other augmentation, a visualization service adds image rendering effects-such as ray-tracing, rasterization, denoising, sharpening, etc.—to add realism to two-dimensional (2D) and/or three-dimensional (3D) models, and/or virtual instrument services that provide for beam-forming, segmentation, inferencing, imaging, and/or support for other applications within pipelines of virtual instruments.

In at least one embodiment, where a service 1320 includes an AI service (e.g., an inference service), one or more machine learning models may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1318 implementing advanced processing and inferencing pipeline that includes segmentation application and anomaly detection application may be streamlined because each application may call upon a same inference service to perform one or more inferencing tasks.

In at least one embodiment, hardware 1322 may include GPUs, CPUs, graphics cards, an AI/deep learning system (e.g., an AI supercomputer, such as NVIDIA's DGX), a cloud platform, or a combination thereof. In at least one embodiment, different types of hardware 1322 may be used to provide efficient, purpose-built support for software 1318 and services 1320 in deployment system 1306. In at least one embodiment, use of GPU processing may be implemented for processing locally (e.g., at facility 1302), within an AI/deep learning system, in a cloud system, and/or in other processing components of deployment system 1306 to improve efficiency, accuracy, and efficacy of image processing and generation. In at least one embodiment, software 1318 and/or services 1320 may be optimized for GPU processing with respect to deep learning, machine learning, and/or high-performance computing, as non-limiting examples. In at least one embodiment, at least some of computing environment of deployment system 1306 and/or training system 1304 may be executed in a datacenter one or more supercomputers or high performance computing systems, with GPU optimized software (e.g., hardware and software combination of NVIDIA's DGX System). In at least one embodiment, hardware 1322 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC) may be executed using an AI/deep learning supercomputer(s) and/or GPU-optimized software (e.g., as provided on NVIDIA's DGX Systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 14 is a system diagram for an example system 1400 for generating and deploying an imaging deployment pipeline, in accordance with at least one embodiment. In at least one embodiment, system 1400 may be used to implement process 1300 of FIG. 13 and/or other processes including advanced processing and inferencing pipelines. In at least one embodiment, system 1400 may include training system 1304 and deployment system 1306. In at least one embodiment, training system 1304 and deployment system 1306 may be implemented using software 1318, services 1320, and/or hardware 1322, as described herein.

In at least one embodiment, system 1400 (e.g., training system 1304 and/or deployment system 1306) may be implemented in a cloud computing environment (e.g., using cloud 1426). In at least one embodiment, system 1400 may be implemented locally with respect to a healthcare services facility, or as a combination of both cloud and local computing resources. In at least one embodiment, access to APIs in cloud 1426 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1400, may be restricted to a set of public IPs that have been vetted or authorized for interaction.

In at least one embodiment, various components of system 1400 may communicate among one another using any of a variety of different network types, including but not limited to local area networks (LANs) and/or wide area networks (WANs) via wired and/or wireless communication protocols. In at least one embodiment, communication between facilities and components of system 1400 (e.g., for transmitting inference requests, for receiving results of inference requests, etc.) may be communicated over data bus (ses), wireless data protocols (Wi-Fi), wired data protocols (e.g., Ethernet), etc.

In at least one embodiment, training system 1304 may execute training pipelines 1404, similar to those described herein with respect to FIG. 13. In at least one embodiment, where one or more machine learning models are to be used in deployment pipelines 1410 by deployment system 1306, training pipelines 1404 may be used to train or retrain one or more (e.g. pre-trained) models, and/or implement one or more of pre-trained models 1406 (e.g., without a need for retraining or updating). In at least one embodiment, as a result of training pipelines 1404, output model(s) 1316 may be generated. In at least one embodiment, training pipelines 1404 may include any number of processing steps, such as but not limited to imaging data (or other input data) conversion or adaption In at least one embodiment, for different machine learning models used by deployment system 1306, different training pipelines 1404 may be used. In at least one embodiment, training pipeline 1404 similar to a first example described with respect to FIG. 13 may be used for a first machine learning model, training pipeline 1404 similar to a second example described with respect to FIG. 13 may be used for a second machine learning model, and training pipeline 1404 similar to a third example described with respect to FIG. 13 may be used for a third machine learning model. In at least one embodiment, any combination of tasks within training system 1304 may be used depending on what is required for each respective machine learning model. In at least one embodiment, one or more of machine learning models may already be trained and ready for deployment so machine learning models may not undergo any processing by training system 1304, and may be implemented by deployment system 1306.

In at least one embodiment, output model(s) 1316 and/or pre-trained model(s) 1406 may include any types of machine learning models depending on implementation or embodiment. In at least one embodiment, and without limitation, machine learning models used by system 1400 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

In at least one embodiment, labeled data 1312 (e.g., traditional annotation) may be generated by any number of techniques, such as within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 1308 (or other data type used by machine learning models), there may be corresponding ground truth data generated by training system 1304. In at least one embodiment, AI-assisted annotation may be performed as part of deployment pipelines 1410; either in addition to, or in lieu of AI-assisted annotation included in training pipelines 1404. In at least one embodiment, system 1400 may include a multi-layer platform that may include a software layer (e.g., software 1318) of diagnostic applications (or other application types) that may perform one or more medical imaging and diagnostic functions. In at least one embodiment, system 1400 may be communicatively coupled to (e.g., via encrypted links) PACS server networks of one or more facilities. In at least one embodiment, system 1400 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 1302). In at least one embodiment, applications may then call or execute one or more services 1320 for performing compute, AI, or visualization tasks associated with respective applications, and software 1318 and/or services 1320 may leverage hardware 1322 to perform processing tasks in an effective and efficient manner.

In at least one embodiment, deployment system 1306 may execute deployment pipelines 1410. In at least one embodiment, deployment pipelines 1410 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline 1410 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline 1410 depending on information desired from data generated by a device. In at least one embodiment, where detections of anomalies are desired from an MRI machine, there may be a first deployment pipeline 1410, and where image enhancement is desired from output of an MRI machine, there may be a second deployment pipeline 1410.

In at least one embodiment, an image generation application may include a processing task that includes use of a machine learning model. In at least one embodiment, a user may desire to use their own machine learning model, or to select a machine learning model from model registry 1324. In at least one embodiment, a user may implement their own machine learning model or select a machine learning model for inclusion in an application for performing a processing task. In at least one embodiment, applications may be selectable and customizable, and by defining constructs of applications, deployment and implementation of applications for a particular user are presented as a more seamless user experience. In at least one embodiment, by leveraging other features of system 1400—such as services 1320 and hardware 1322—deployment pipelines 1410 may be even more user friendly, provide for easier integration, and produce more accurate, efficient, and timely results.

In at least one embodiment, deployment system 1306 may include a user interface 1414 (e.g., a graphical user interface, a web interface, etc.) that may be used to select applications for inclusion in deployment pipeline(s) 1410, arrange applications, modify or change applications or parameters or constructs thereof, use and interact with deployment pipeline(s) 1410 during set-up and/or deployment, and/or to otherwise interact with deployment system 1306. In at least one embodiment, although not illustrated with respect to training system 1304, user interface 1414 (or a different user interface) may be used for selecting models for use in deployment system 1306, for selecting models for training, or retraining, in training system 1304, and/or for otherwise interacting with training system 1304.

In at least one embodiment, pipeline manager 1412 may be used, in addition to an application orchestration system 1428, to manage interaction between applications or containers of deployment pipeline(s) 1410 and services 1320 and/or hardware 1322. In at least one embodiment, pipeline manager 1412 may be configured to facilitate interactions from application to application, from application to service 1320, and/or from application or service to hardware 1322. In at least one embodiment, although illustrated as included in software 1318, this is not intended to be limiting, and in some examples (e.g., as illustrated in FIG. 12cc) pipeline manager 1412 may be included in services 1320. In at least one embodiment, application orchestration system 1428 (e.g., Kubernetes, DOCKER, etc.) may include a container orchestration system that may group applications into containers as logical units for coordination, management, scaling, and deployment. In at least one embodiment, by associating applications from deployment pipeline(s) 1410 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1412 and application orchestration system 1428. In at least one embodiment, so long as an expected input and/or output of each container or application is known by a system (e.g., based on constructs of applications or containers), application orchestration system 1428 and/or pipeline manager 1412 may facilitate communication among and between, and sharing of resources among and between, each of applications or containers. In at least one embodiment, because one or more of applications or containers in deployment pipeline(s) 1410 may share same services and resources, application orchestration system 1428 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1428) may determine resource availability and distribution based on constraints imposed on a system (e.g., user constraints), such as quality of service (QOS), urgency of need for data outputs (e.g., to determine whether to execute real-time processing or delayed processing), etc.

In at least one embodiment, services 1320 leveraged by and shared by applications or containers in deployment system 1306 may include compute services 1416, AI services 1418, visualization services 1420, and/or other service types. In at least one embodiment, applications may call (e.g., execute) one or more of services 1320 to perform processing operations for an application. In at least one embodiment, compute services 1416 may be leveraged by applications to perform super-computing or other high-performance computing (HPC) tasks. In at least one embodiment, compute service(s) 1416 may be leveraged to perform parallel processing (e.g., using a parallel computing platform 1430) for processing data through one or more of applications and/or one or more tasks of a single application, substantially simultaneously. In at least one embodiment, parallel computing platform 1430 (e.g., NVIDIA's CUDA) may enable general purpose computing on GPUs (GPGPU) (e.g., GPUs 1422). In at least one embodiment, a software layer of parallel computing platform 1430 may provide access to virtual instruction sets and parallel computational elements of GPUs, for execution of compute kernels. In at least one embodiment, parallel computing platform 1430 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1430 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1418 may be leveraged to perform inferencing services for executing machine learning model(s) associated with applications (e.g., tasked with performing one or more processing tasks of an application). In at least one embodiment, AI services 1418 may leverage AI system 1424 to execute machine learning model(s) (e.g., neural networks, such as CNNs) for segmentation, reconstruction, object detection, feature detection, classification, and/or other inferencing tasks. In at least one embodiment, applications of deployment pipeline(s) 1410 may use one or more of output models 1316 from training system 1304 and/or other models of applications to perform inference on imaging data. In at least one embodiment, two or more examples of inferencing using application orchestration system 1428 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1428 may distribute resources (e.g., services 1320 and/or hardware 1322) based on priority paths for different inferencing tasks of AI services 1418.

In at least one embodiment, shared storage may be mounted to AI services 1418 within system 1400. In at least one embodiment, shared storage may operate as a cache (or other storage device type) and may be used to process inference requests from applications. In at least one embodiment, when an inference request is submitted, a request may be received by a set of API instances of deployment system 1306, and one or more instances may be selected (e.g., for best fit, for load balancing, etc.) to process a request. In at least one embodiment, to process a request, a request may be entered into a database, a machine learning model may be located from model registry 1324 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1412) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (e.g., TAT<10 min). In at least one embodiment, model execution times may be measured from requesting institution or entity and may include partner network traversal time, as well as execution on an inference service.

In at least one embodiment, transfer of requests between services 1320 and inference applications may be hidden behind a software development kit (SDK), and robust transport may be provide through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1426, and an inference service may perform inferencing on a GPU.

In at least one embodiment, visualization services 1420 may be leveraged to generate visualizations for viewing outputs of applications and/or deployment pipeline(s) 1410. In at least one embodiment, GPUs 1422 may be leveraged by visualization services 1420 to generate visualizations. In at least one embodiment, rendering effects, such as raytracing, may be implemented by visualization services 1420 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1420 may include an internal visualizer, cinematics, and/or other rendering or image processing capabilities or functionality (e.g., ray tracing, rasterization, internal optics, etc.).

In at least one embodiment, hardware 1322 may include GPUs 1422, AI system 1424, cloud 1426, and/or any other hardware used for executing training system 1304 and/or deployment system 1306. GPUs 1422 (e.g., NVIDIA's TESLA and/or QUADRO GPUs) may include any number of GPUs that may be used for executing processing tasks of compute services 1416, AI services 1418, visualization services 1420, other services, and/or any of features or functionality of software 1318. For example, with respect to AI services 1418, GPUs 1422 may be used to perform pre-processing on imaging data (or other data types used by machine learning models), post-processing on outputs of machine learning models, and/or to perform inferencing (e.g., to execute machine learning models). Cloud 1426, AI system 1424, and/or other components of system 1400 may use GPUs 1422. Cloud 1426 may include a GPU-optimized platform for deep learning tasks. AI system 1424 may use GPUs, and cloud 1426—or at least a portion tasked with deep learning or inferencing—may be executed using one or more AI systems 1424. As such, although hardware 1322 is illustrated as discrete components, this is not intended to be limiting, and any components of hardware 1322 may be combined with, or leveraged by, any other components of hardware 1322.

AI system 1424 may include a purpose-built computing system (e.g., a supercomputer or an HPC) configured for inferencing, deep learning, machine learning, and/or other artificial intelligence tasks. AI system 1424 (e.g., NVIDIA's DGX) may include GPU-optimized software (e.g., a software stack) that may be executed using a plurality of GPUs 1422, in addition to CPUs, RAM, storage, and/or other components, features, or functionality. One or more AI systems 1424 may be implemented in cloud 1426 (e.g., in a data center) for performing some or all of AI-based processing tasks of system 1400.

In at least one embodiment, cloud 1426 may include a GPU-accelerated infrastructure (e.g., NVIDIA's NGC) that may provide a GPU-optimized platform for executing processing tasks of system 1400. Cloud 1426 may include an AI system(s) 1424 for performing one or more of AI-based tasks of system 1400 (e.g., as a hardware abstraction and scaling platform). Cloud 1426 may integrate with application orchestration system 1428 leveraging multiple GPUs to enable seamless scaling and load balancing between and among applications and services 1320. Cloud 1426 may tasked with executing at least some of services 1320 of system 1400, including compute services 1416, AI services 1418, and/or visualization services 1420, as described herein. Cloud 1426 may perform small and large batch inference (e.g., executing NVIDIA's TENSOR RT), provide an accelerated parallel computing API and platform 1430 (e.g., NVIDIA's CUDA), execute application orchestration system 1428 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1400.

In sum, the disclosed techniques perform audio-driven facial animation with adaptive speech rate. An audio segment is analyzed to determine whether the speech rate within the audio segment exceeds one or more thresholds. For example, a neural network and/or another type of audio-processing component may be used to detect a number of phonemes, a number of transitions between phonemes, and/or another measure of the speech rate within a 0.5-second audio segment. The detected speech rate may be compared with one or more thresholds representing various speech rates that are higher than a normal speech rate. If the detected speech rate meets or exceeds a given threshold, the detected speech rate may be determined to be at or above the high speech rate represented by the threshold. If the detected speech rate falls below all thresholds, the detected speech rate may be determined to correspond to a normal speech rate.

When the speech rate associated with an audio segment is determined to exceed a given threshold, audio features that are extracted from the audio segment are upsampled, and some or all of the upsampled audio features are provided as input into one or more machine learning models that are used to perform facial animation for the audio segment. For example, an encoder and/or another type of neural network may be used to convert the audio segment into a list of 25 audio features. Within the list, the features may be ordered by time and represent contiguous subsets of the audio segment. When the speech rate of the audio segment exceeds a threshold representing a high speech rate, bilinear upsampling of the audio features may be performed to increase the number of audio features by a corresponding factor. A subset of the upsampled audio features may be selected and inputted into one or more neural networks. The neural network(s) may then convert the inputted subset of upsampled audio features into vertex locations, geometric deformations, and/or other representations of a facial shape or expression that matches the audio segment.

One technical advantage of the disclosed techniques relative to prior approaches is the ability to adapt audio-driven facial animation techniques to audio with varying speech rates. Accordingly, the disclosed techniques can be used to improve the accuracy, realism, and/or expressiveness of the facial animations when compared with conventional audio-driven facial animation approaches that do not account for varying speech rates in input audio. Another advantage of the disclosed techniques is that the improvement in animation quality for fast speech rates can be achieved without requiring machine learning models involved in the audio-driven facial animation to be trained using audio data that includes varying speech rates. Consequently, the disclosed techniques avoid additional overhead and resource consumption associated with collecting additional training data for the machine learning models and training the machine learning models using the additional training data.

1. In some embodiments, a method comprises determining that a rate of speech associated with an audio segment exceeds a threshold; based at least on the rate of speech exceeding the threshold, upsampling a first set of features associated with the audio segment into a second set of features that is different in size than the first set of features; and generating, using one or more machine learning models and based at least on at least a subset of the second set of features, a facial animation output corresponding to the audio segment.

2. The method of clause 1, further comprising determining that a second rate of speech associated with a second audio segment exceeds a second threshold that is higher than the threshold; based at least on the second rate of speech exceeding the second threshold, upsampling a third set of features associated with the second audio segment into a fourth set of features that is different in size than the second set of features; and generating, using the one or more machine learning models and based at least on at least a subset of the fourth set of features, a second facial animation output corresponding to the second audio segment.

3. The method of any of clauses 1-2, wherein the first set of features is upsampled into the second set of features based at least on a first upsampling factor associated with the threshold and the third set of features is upsampled into the fourth set of features based at least on a second upsampling factor associated with the second threshold.

4. The method of any of clauses 1-3, further comprising converting, using an encoder neural network, the audio segment into a time-varying sequence of features corresponding to the first set of features.

5. The method of any of clauses 1-4, further comprising extracting the audio segment from an audio sample at a predetermined offset from a beginning of a previous audio segment extracted from the audio sample.

6. The method of any of clauses 1-5, further comprising executing a speech rate detection neural network to determine the rate of speech associated with the audio segment.

7. The method of any of clauses 1-6, wherein the upsampling the first set of features into the second set of features comprises performing bilinear upsampling of the first set of features to generate the second set of features.

8. The method of any of clauses 1-7, wherein the generating the facial animation output comprises extracting the subset of the second set of features from a central portion of a time axis spanned by the second set of features; executing an articulation neural network included in the one or more machine learning models to generate a third set of features based at least on additional input that includes the subset of the second set of features and a fourth set of features representing an emotional state associated with the audio segment; and executing an output neural network included in the one or more machine learning models to convert the third set of features into the facial animation output.

9. The method of any of clauses 1-8, wherein the rate of speech corresponds to one of a number of phonemes per time period or a number of transitions between phonemes per time period.

10. The method of any of clauses 1-9, wherein the facial animation output comprises at least one of a head displacement, a jaw displacement, an eyeball rotation, a set of skin vertex positions, a set of tongue vertex positions, or a set of principal components analysis (PCA) coefficients.

11. In some embodiments, a processor comprises one or more circuits to perform operations comprising determining that a rate of speech associated with an audio segment exceeds a threshold; based at least on the rate of speech exceeding the threshold, upsampling a first set of features associated with the audio segment into a second set of features that is different in size than the first set of features; and generating, using one or more machine learning models and based at least on at least a subset of the second set of features, a facial animation output corresponding to the audio segment.

12. The processor of clause 11, wherein the operations further comprise determining that a second rate of speech associated with a second audio segment does not exceed the threshold; and based at least on the second rate of speech not exceeding the threshold, generating, using the one or more machine learning models and based at least on a third set of features, a second facial animation output for the second audio segment.

13. The processor of any of clauses 11-12, wherein the operations further comprise determining that a second rate of speech associated with a second audio segment exceeds one or more thresholds that are higher than the threshold; based at least on the second rate of speech exceeding the one or more thresholds, upsampling a third set of features associated with the second audio segment into a fourth set of features, wherein the fourth set of features is larger than the second set of features; and generating, using the one or more machine learning models and based at least on additional input that includes at least a subset of the fourth set of features, a second facial animation output for the second audio segment.

14. The processor of any of clauses 11-13, wherein the first set of features is upsampled into the second set of features based at least on a first upsampling factor associated with the threshold and the third set of features is upsampled into the fourth set of features based at least on a second upsampling factor associated with a highest threshold included in the one or more thresholds.

15. The processor of any of clauses 11-14, wherein the generating the facial animation output comprises extracting the subset of the second set of features from a central portion of a time axis spanned by the second set of features; executing an articulation neural network included in the one or more machine learning models to generate a third set of features based at least on additional input that includes the subset of the second set of features and a fourth set of features representing at least one of an emotional state or a style; and executing an output neural network included in the one or more machine learning models to convert the third set of features into the facial animation output.

16. The processor of any of clauses 11-15, wherein the subset of the second set of features is equal in number to the first set of features.

17. The processor of any of clauses 11-16, wherein the first set of features is upsampled into the second set of features using a bilinear upsampling technique.

18. The processor of any of clauses 11-17, wherein the processor is comprised in at least one of a system for performing simulation operations; a system for performing digital twin operations; a system for performing collaborative content creation for 3D assets; a system for performing deep learning operations; a system implemented using an edge device; a system for generating or presenting at least one of virtual reality content, augmented reality content, or mixed reality content; a system implemented using a robot; a system for performing conversational AI operations; a system implemented using one or more large language models (LLMs); a system for generating synthetic data; a system incorporating one or more virtual machines (VMs); a system implemented at least partially in a data center; or a system implemented at least partially using cloud computing resources.

19. In some embodiments, a system comprises one or more processing units to perform operations comprising determining that a rate of speech associated with an audio segment exceeds a threshold; based at least on the rate of speech exceeding the threshold, upsampling a first set of features associated with the audio segment into a second set of features that is different in size than the first set of features; and generating, using one or more machine learning models and based at least on at least a subset of the second set of features, a facial animation output corresponding to the audio segment.

20. The system of clause 19, wherein the system is comprised in at least one of a system for performing simulation operations; a system for performing digital twin operations; a system for performing collaborative content creation for 3D assets; a system for performing deep learning operations; a system implemented using an edge device; a system for generating or presenting at least one of virtual reality content, augmented reality content, or mixed reality content; a system implemented using a robot; a system for performing conversational AI operations; a system implemented using one or more large language models (LLMs); a system for generating synthetic data; a system incorporating one or more virtual machines (VMs); a system implemented at least partially in a data center; or a system implemented at least partially using cloud computing resources.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types.

The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method, comprising:
    determining that a rate of speech associated with an audio segment exceeds a threshold;
    based at least on the rate of speech exceeding the threshold, upsampling a first set of features associated with the audio segment into a second set of features that is different in size than the first set of features; and
    generating, using one or more machine learning models and based at least on at least a subset of the second set of features, a facial animation output corresponding to the audio segment.

2. The method of claim 1, further comprising:
    determining that a second rate of speech associated with a second audio segment exceeds a second threshold that is higher than the threshold;
    based at least on the second rate of speech exceeding the second threshold, upsampling a third set of features associated with the second audio segment into a fourth set of features that is different in size than the second set of features; and
    generating, using the one or more machine learning models and based at least on at least a subset of the fourth set of features, a second facial animation output corresponding to the second audio segment.

3. The method of claim 2, wherein the first set of features is upsampled into the second set of features based at least on a first upsampling factor associated with the threshold and the third set of features is upsampled into the fourth set of features based at least on a second upsampling factor associated with the second threshold.

4. The method of claim 1, further comprising converting, using an encoder neural network, the audio segment into a time-varying sequence of features corresponding to the first set of features.

5. The method of claim 1, further comprising extracting the audio segment from an audio sample at a predetermined offset from a beginning of a previous audio segment extracted from the audio sample.

6. The method of claim 1, further comprising executing a speech rate detection neural network to determine the rate of speech associated with the audio segment.

7. The method of claim 1, wherein the upsampling the first set of features into the second set of features comprises performing bilinear upsampling of the first set of features to generate the second set of features.

8. The method of claim 1, wherein the generating the facial animation output comprises:
    extracting the subset of the second set of features from a central portion of a time axis spanned by the second set of features;
    executing an articulation neural network included in the one or more machine learning models to generate a third set of features based at least on additional input that includes the subset of the second set of features and a fourth set of features representing an emotional state associated with the audio segment; and
    executing an output neural network included in the one or more machine learning models to convert the third set of features into the facial animation output.

9. The method of claim 1, wherein the rate of speech corresponds to one of a number of phonemes per time period or a number of transitions between phonemes per time period.

10. The method of claim 1, wherein the facial animation output comprises at least one of a head displacement, a jaw displacement, an eyeball rotation, a set of skin vertex positions, a set of tongue vertex positions, or a set of principal components analysis (PCA) coefficients.

11. A processor comprising:
    one or more circuits to perform operations comprising:
        determining that a rate of speech associated with an audio segment exceeds a threshold;
        based at least on the rate of speech exceeding the threshold, upsampling a first set of features associated with the audio segment into a second set of features that is different in size than the first set of features; and
        generating, using one or more machine learning models and based at least on at least a subset of the second set of features, a facial animation output corresponding to the audio segment.

12. The processor of claim 11, wherein the operations further comprise:
    determining that a second rate of speech associated with a second audio segment does not exceed the threshold; and
    based at least on the second rate of speech not exceeding the threshold, generating, using the one or more machine learning models and based at least on a third set of features, a second facial animation output for the second audio segment.

13. The processor of claim 11, wherein the operations further comprise:
    determining that a second rate of speech associated with a second audio segment exceeds one or more thresholds that are higher than the threshold;

based at least on the second rate of speech exceeding the one or more thresholds, upsampling a third set of features associated with the second audio segment into a fourth set of features, wherein the fourth set of features is larger than the second set of features; and generating, using the one or more machine learning models and based at least on additional input that includes at least a subset of the fourth set of features, a second facial animation output for the second audio segment.

14. The processor of claim 13, wherein the first set of features is upsampled into the second set of features based at least on a first upsampling factor associated with the threshold and the third set of features is upsampled into fourth set of features based at least on a second upsampling factor associated with a highest threshold included in the one or more thresholds.

15. The processor of claim 11, wherein the generating the facial animation output comprises:

extracting the subset of the second set of features from a central portion of a time axis spanned by the second set of features;

executing an articulation neural network included in the one or more machine learning models to generate a third set of features based at least on additional input that includes the subset of the second set of features and a fourth set of features representing at least one of an emotional state or a style; and executing an output neural network included in the one or more machine learning models to convert the third set of features into the facial animation output.

16. The processor of claim 15, wherein the subset of the second set of features is equal in number to the first set of features.

17. The processor of claim 11, wherein the first set of features is upsampled into the second set of features using a bilinear upsampling technique.

18. The processor of claim 11, wherein the processor is comprised in at least one of:

a system for performing simulation operations;

a system for performing digital twin operations;

a system for performing collaborative content creation for 3D assets;

a system for performing deep learning operations;

a system implemented using an edge device;

a system for generating or presenting at least one of virtual reality content, augmented reality content, or mixed reality content;

a system implemented using a robot;

a system for performing conversational AI operations;

a system implemented using one or more large language models (LLMs);

a system for generating synthetic data;

a system incorporating one or more virtual machines (VMs);

a system implemented at least partially in a data center; or a system implemented at least partially using cloud computing resources.

19. A system comprising:

one or more processing units to perform operations comprising:

determining that a rate of speech associated with an audio segment exceeds a threshold;

based at least on the rate of speech exceeding the threshold, upsampling a first set of features associated with the audio segment into a second set of features that is different in size than the first set of features; and generating, using one or more machine learning models and based at least on at least a subset of the second set of features, a facial animation output corresponding to the audio segment.

20. The system of claim 19, wherein the system is comprised in at least one of:

a system for performing simulation operations;

a system for performing digital twin operations;

a system for performing collaborative content creation for 3D assets;

a system for performing deep learning operations;

a system implemented using an edge device;

a system for generating or presenting at least one of virtual reality content, augmented reality content, or mixed reality content;

a system implemented using a robot;

a system for performing conversational AI operations;

a system implemented using one or more large language models (LLMs);

a system for generating synthetic data;

a system incorporating one or more virtual machines (VMs);

a system implemented at least partially in a data center; or a system implemented at least partially using cloud computing resources.

* * * * *